(12) United States Patent
Malitski et al.

(10) Patent No.: US 7,983,942 B2
(45) Date of Patent: Jul. 19, 2011

(54) INCOMPATIBILITY PROCESSING

(75) Inventors: Konstantin Malitski, Wiesloch (DE);
Jens Gottlieb, Schwetzingen (DE);
Christoph Eckert, Muehlhausen (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 12/703,039

(22) Filed: Feb. 9, 2010

(65) Prior Publication Data
US 2010/0205026 A1 Aug. 12, 2010

Related U.S. Application Data

(63) Continuation of application No. 11/628,469, filed on Dec. 1, 2006, now Pat. No. 7,660,732.

(51) Int. Cl.
*G06F 9/46* (2006.01)
*G06F 9/44* (2006.01)

(52) U.S. Cl. ........................ 705/7.22; 705/338; 705/7.26

(58) Field of Classification Search .................... 705/1.1, 705/7, 8, 9, 11, 13, 28–30, 400, 7.22, 338, 705/7.26, 7.24, 337; 703/2, 6
See application file for complete search history.

(56) References Cited

U.S. PATENT DOCUMENTS

| | | | |
|---|---|---|---|
| 5,265,006 A * | 11/1993 | Asthana et al. | 705/8 |
| 5,835,716 A | 11/1998 | Hunt et al. | |
| 5,880,958 A | 3/1999 | Helms et al. | |
| 7,672,855 B2 * | 3/2010 | Peterkofsky et al. | 705/338 |
| 2002/0019759 A1 * | 2/2002 | Arunapuram et al. | 705/7 |
| 2003/0172007 A1 * | 9/2003 | Helmolt et al. | 705/28 |
| 2005/0246192 A1 | 11/2005 | Jauffred et al. | |
| 2006/0195348 A1 * | 8/2006 | Peterkofsky et al. | 705/8 |
| 2006/0224423 A1 * | 10/2006 | Sun et al. | 705/7 |
| 2006/0241990 A1 * | 10/2006 | Sun et al. | 705/8 |
| 2006/0265234 A1 * | 11/2006 | Peterkofsky et al. | 705/1 |
| 2007/0136079 A1 * | 6/2007 | Beykirch et al. | 705/1 |
| 2008/0077464 A1 | 3/2008 | Gottlieb et al. | |

OTHER PUBLICATIONS

Gumus et al. Cross-Docking and Its Implications in Loacation-Distribution Systems; Journal of Business Logistics, 2004, 3 pages.*
Non-Final Office Action dated Jun. 17, 2009, U.S. Appl. No. 11/628,469, filed Dec. 1, 2006, 11 pgs.

* cited by examiner

*Primary Examiner* — Igor Borissov
(74) *Attorney, Agent, or Firm* — Blakely Sokoloff Taylor & Zafman LLP

(57) ABSTRACT

A method of processing incompatibilities for a transportation plan comprising the following steps: Receiving data which is descriptive of orders, data which is descriptive of available vehicles, and data which is descriptive of available cross-docking locations; reading a set of compatibility types, and a set of compatibility rules with respect to the plurality of orders, vehicles, and cross-docking locations, each compatibility rule specifying a combination of two values which refer to first and second attributes of a defined compatibility type, and being indicative whether or not they are compatible; associating a value with each order, the value being descriptive of the characteristics of the order, such that orders having the same characteristics have the same value associated therewith; replacing the data descriptive of the characteristics by the value associated therewith; and outputting the order data resulting from the preceding step.

7 Claims, 19 Drawing Sheets

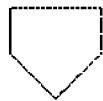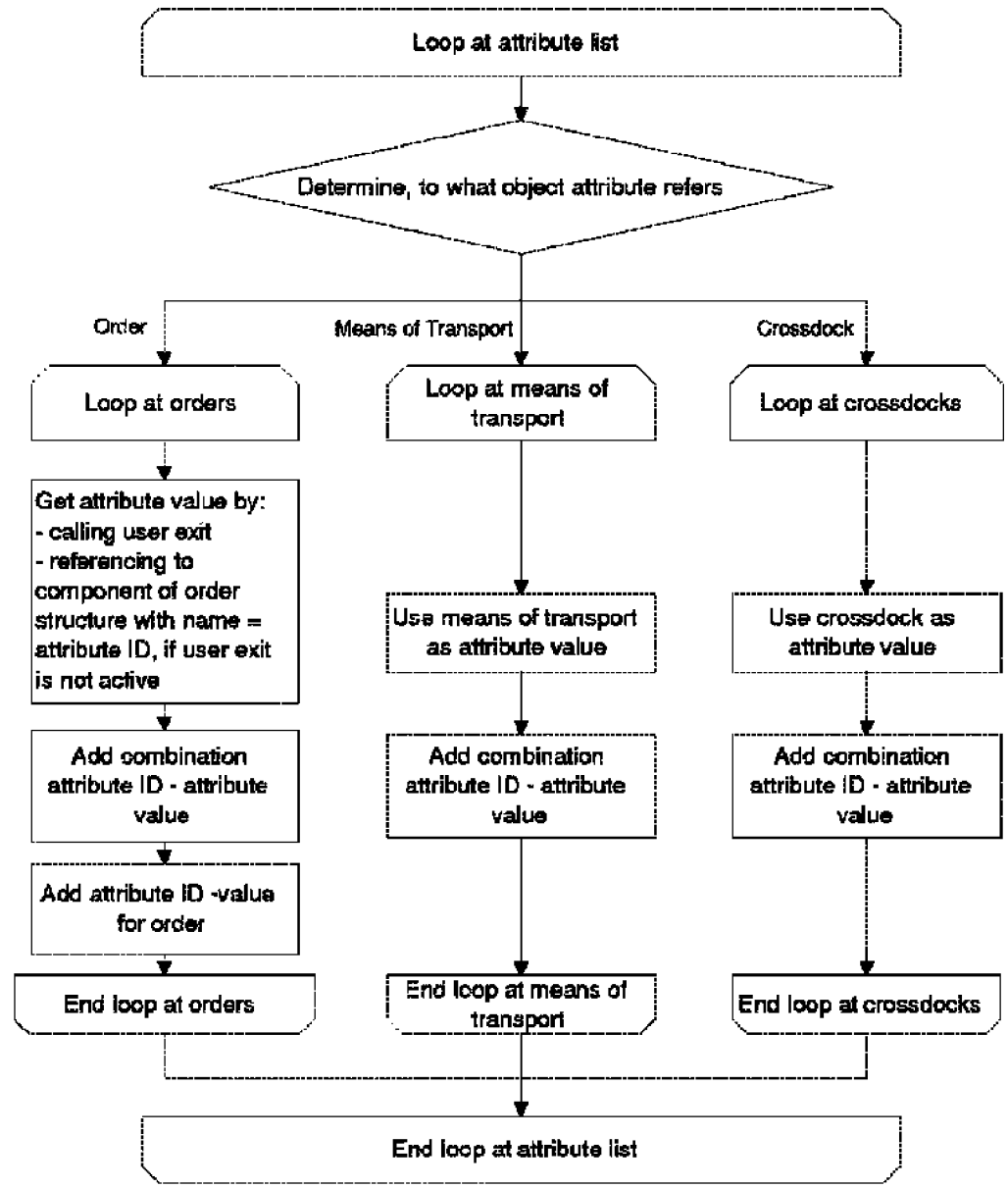
Fig. 9

| Change View "Compatibility Types used in TP/VS Optimizer": Overview |
| --- |

New Entries

| Compatibility Types used in TP/VS Optimizer | | | |
| --- | --- | --- | --- |
| Cp.Type | Field1 Name | Field2 Name | Text |
| 1 | Means of Transport | Transportation Group | Means of Transport - Trans |
| 2 | Transportation Group | Transportation Group | Transportation Group - Tra |
| 3 | Target Location | Means of Transport | Target Location - Means of |
| 4 | Material Number | Volume Group | Material - Volume |
| 5 | Material Number | Weight Group | Material - Weight |
| 6 | Means of Transport | Cross-docking Location | Means of Transport - Hub ( |
| 7 | Target Location | Cross-docking Location | Target Location - Hub |
| 8 | Incoterms Part1 | Incoterms Part1 | Incoterm and Incoterm |
| 9 | Incoterms Part1 | Means of Transport | |
| 10 | Weight Group | Means of Transport | |
| 11 | Transportation Group | Means of Transport | |

Fig. 17

Compatibilities for TP/VS Optimizer

Conditions

Select Compatibility Type: Transportation Group - Transportation Group

Compatibilities

| Transportation Group | Transportation Group | Compatibility Flag | Opt. Profile | Condition |
|---|---|---|---|---|
| DANG | LIQ | Compatible | | |
| FOOD | ALC | Compatible | | |
| | | Compatible | | |
| | | Incompatible | | |

FIG. 19

INCOMPATIBILITY PROCESSING

This application is a continuation of pending U.S. patent application Ser. No. 11/628,469, filed Dec. 1, 2006, entitled INCOMPATIBILITY PROCESSING.

The present invention relates to the field of transportation planning and optimization (TPO). In general, the goal of transportation planning and optimization is to find a feasible transportation plan with minimum costs. A transportation plan assigns transportation orders to vehicles and determines the scheduling of the involved logistic activities. Such a plan is called feasible, if it satisfies the desired technical constraints, like e.g. the loading capacities of vehicles. There is a large variety of different constraints which may be denoted as compatibilities or incompatibilities.

For example, certain product groups may not be shipped together on the same vehicle, orders of specific incoterms, i.e., specific contractual trade regulations, are not to be combined into same shipments, locations may not have special equipment to unload specific products, etc.

Compatibility can not only be (in)compatibility in itself, but also, for example, a requirement for special transportation conditions like vehicle, or the definition of a specific indirect shipment mode in multimodal transportation. The last possibility makes this especially important in transportation scenarios involving multi-cross-docking. These constraints should be taken into account efficiently during TPO.

As mentioned above, the main aim of TPO is to create an optimal transportation plan, which contains in particular route, scheduling and capacity information. The main objects which are involved in TPO and which are important from compatibility point of view are:

order: represents transportation order in form of freight unit, which contains all planning-relevant information, derived from original order document (like sales order, delivery, stock transfer order, etc.) information. Order number uniquely identifies corresponding order in planning system and can be used to get data for this order.

vehicle: represents capacity, availability and other information which corresponds to physical vehicles performing transportation (trucks, rail, etc.)

vehicle: represents the class of vehicles with similar or identical properties on planning perspective).

cross-docking location: represents possible location (warehouse, plant, carrier, distribution center, etc.), where goods can be reloaded. Cross-docking location number uniquely identifies corresponding location in planning system.

The result of TPO are shipments, which contain information on assignments of orders to vehicles, corresponding activities (like goods issue, receipt, transport, empty leg and so on) and other planning information like stages, carriers, deadlines, etc.

In TPO systems of the art, there is no general concept of modeling compatibilities. Only very specific incompatibility requirements can be modeled in known transportation planning/vehicle scheduling (TP/VS) systems: Vehicle—Location, Transportation Group—Transportation Group, Vehicle—Transportation Group. These compatibilities are defined explicitly on corresponding fields. They are maintained in separate transactions, also processing of them is done in different areas. Optimizer interface contains three input tables, which directly correspond to these incompatibility structures. Transportation group is specified as field in order data input data.

Further, there is an impossibility to add new compatibility requirements without changing optimization engine and extending the interface. Further, it is not possible to use order characteristic other than transportation group, for compatibility definition. Moreover, it is not possible to restrict validity of compatibilities to orders which satisfy certain criteria. Yet more, there is a separate maintenance of compatibilities of different types.

One object of the present invention is to overcome the restrictions as described above.

This object is achieved by the methods and apparatuses according to the claims.

According to the embodiment of the invention, there is provided a method of modeling incompatibilities in a transportation planning and optimization system, wherein a transportation plan is determined for a plurality of orders, each order being defined by a predefined number of characteristics, one of the characteristics specifying freight units to be transported from a predetermined place of departure to a predetermined place of destination, each freight unit representing a predefined good, a plurality of vehicles for transporting freight units, and a plurality of cross-docking locations for loading/unloading freight units onto/from vehicles, the transportation plan defining shipments, each shipment specifying the vehicles, and cross-docking locations needed for fulfilling the plurality of orders, wherein a number of freight units, vehicles, and cross-docking locations are incompatible to each other such that they are not allowed within the same shipment;

each of the freight units, vehicles, and cross-docking locations being specified by attributes which are comprised in a field catalogue;

the modeling method comprising the following steps:

providing a data structure for the field catalogue, the field catalogue providing data field attributes, each of the attributes representing one of freight units, vehicles, and cross-docking locations, respectively;

providing a data structure for a plurality of compatibility types, the data structure providing for each compatibility type data fields for:

a first entry for linking the compatibility type structure with a first attribute of the field catalogue;

a second entry for linking the compatibility type structure with a second attribute of the field catalogue;

providing a number of different compatibility types, each compatibility type being described by values of the data fields as defined in the provided compatibility type data structure;

wherein a number of compatibility rules is provided, each compatibility rule specifying a combination of two values which refer to first and second attributes of a defined compatibility type, and being indicative whether or not they are compatible, the compatibility rules being applied upon determining compatible combinations of freight units, vehicles, and cross-docking locations for the shipments of the transportation plan.

In a further aspect of the invention, the compatibility type data structure further provides a data field for an ID for identifying the respective compatibility type.

The compatibility type ID may be a numeric value.

The compatibility types may comprise at least one of transportation group, and transportation group;

vehicle, and transportation group;

incoterm, and incoterm;

cross-docking location, and transportation group;

delivery priority, and cross-docking location;
delivery priority, and vehicle;
shipping conditions, and cross-docking location;
shipping conditions, and vehicle;
weight/volume group, and vehicle;
weight/volume group, and cross-docking location;
transportation zone, and vehicle; and
cross-docking location, and vehicle;

A compatibility rule may further comprise a condition ID for restricting the applicability of the compatibility rule onto predefined orders.

According to a further embodiment of the invention there is provided a method of processing incompatibilities for a transportation plan for
- a plurality of orders, each order being defined by a predefined number of characteristics, one of the characteristics specifying freight units to be transported from a predetermined place of departure to a predetermined place of destination, each freight unit representing a predefined good,
- a plurality of vehicles for transporting freight units, and
- a plurality of cross-docking locations for loading/unloading freight units onto/from vehicles, the transportation plan defining shipments, each shipment specifying the vehicles, and cross-docking locations needed for fulfilling the plurality of orders, whereby a number of freight units, vehicles, and cross-docking locations are incompatible to each other such that they may not be allowed within the same shipment;

each of the freight units, vehicles, and cross-docking locations being specified by attributes which are comprised in a field catalogue;

the method comprising the following:

Receiving
  data which is descriptive of the orders,
  data which is descriptive of the available vehicles, and
  data which is descriptive of the available cross-docking locations;

reading a set of compatibility types, and a set of compatibility rules with respect to the plurality of orders, vehicles, and cross-docking locations, each compatibility rule specifying a combination of two values which refer to first and second attributes of a defined compatibility type, and being indicative whether or not they are compatible;

associating a value with each order, the value being descriptive of the characteristics of the order, such that orders having the same characteristics have the same value associated therewith;

replacing the data descriptive of the characteristics by the value associated therewith; and outputting the order data resulting from the preceding operation.

According to a further aspect of the embodiment, the following steps are performed prior to the outputting:
classifying orders having the same value associated therewith into a group; replacing the groups which have identical incompatibility relations to all other groups by a class; and creating a data representation of the orders, whereby the orders are grouped into classes of orders having the same incompatibilities to the other classes.

According to a further aspect the groups of orders are represented by an object-oriented model, the model comprising as one object the group of orders, and as second object an incompatibility matrix, the matrix representing the incompatibilities between pairs of groups; as third object a data structure representing incompatibilities between vehicle and orders, and between orders and cross-docking locations; and as fourth object incompatibilities between cross-docking locations and vehicles.

According to a yet further aspect of the embodiment, each order object comprises a data field which specifies the group; the incompatibilities matrix object comprises for each pair of order groups an information as to whether they are compatible or not; each order object comprises a set of legs referring to relevant compatible cross-docking locations; and leg objects which comprise a set of compatible vehicles.

Thus, according to the embodiments of the invention, a generic model is proposed that allows maintenance and processing of compatibility constraints between arbitrary planning object attributes. This model includes:
- a new concept of compatibility type, which allows flexible definition of compatibility constraints between arbitrary object attributes;
- a new algorithm, which performs conversion of such compatibility constraints into four incompatibility classes relevant for transportation, taking into account possible validity conditions;
- new optimization algorithms that reduce this generic model into a very compact model, enabling a transportation optimizer to focus on the core of the generic compatibility model.

Embodiments of the present invention allows very generic modeling in a straightforward manner, without loosing efficiency in the optimization and planning. The main advantages of some embodiments of the present invention are:

High modeling flexibility of using of any order attribute as possible compatibility definition in combination with vehicle and cross-docking location. This allows definition and handling of arbitrary compatibilities between different order attributes/characteristics, locations, and vehicles.

Furthermore, in optimization the general model can be reduced efficiently into its core before actual optimization. Thus, optimization does not loose efficiency, but it can solve transportation scenarios of a broader scope, viewed from the perspective of modeling compatibilities.

Stated otherwise, on the one hand, the user describing a transportation optimization problem is very flexible because he is not restricted to the compact modeling used by the optimizer—instead, he can use the very generic modeling approach. On the other hand, the developer of the optimizer has no need to care about numerous different compatibility constraints. The developer can focus on implementing the four atomic compatibility constraints.

As the invention uses the same compatibility engine, it is achieved that while optimization and manual planning, the same constraints are respected. In manual planning nevertheless they could be disregarded by planners, thus, allowing a common handling of compatibilities in both optimization and manual planning.

It is not necessary to do any code modifications to handle customer-defined fields included in freight unit, they are processed automatically by standard coding, thus leading to an easier way of handling with customer extensions.

Advantageous implementations can include one or more of the following features.

In particular, the invention comprises also computer systems for performing the inventive methods.

Furthermore, the invention comprises computer-readable storage media comprising program code for performing the inventive methods, when loaded into a computer system.

The present invention is further described with reference to the drawings, wherein FIG. 1 illustrates the definition of compatibility types;

FIG. 9 illustrates a first subprocess of the compatibility processing;

FIGS. 17 to 19 illustrate screen shots of compatibility transaction.

Figure 1:
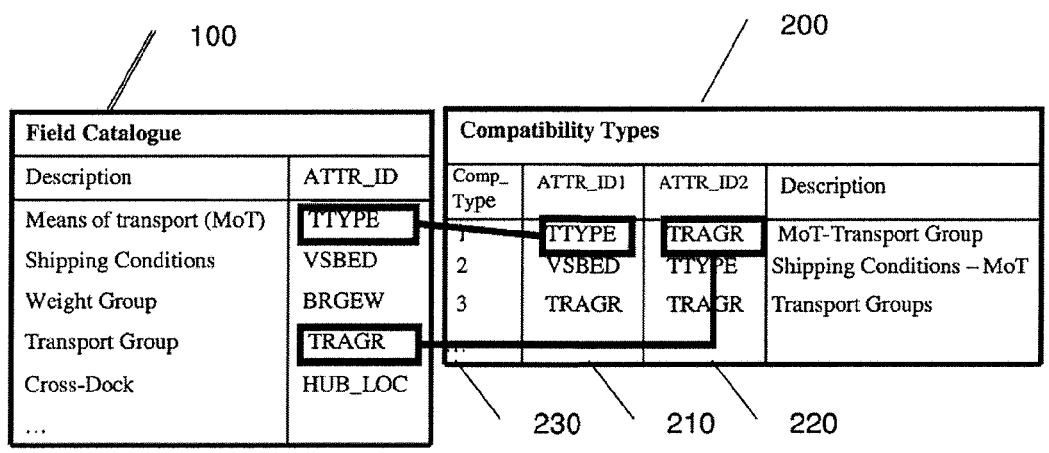

Compatibility type definition is based on field catalogue functionality (see FIG. 1). Field catalogue 100 contains declarations (in form of character identifiers (ID) plus additional optional information like description, check table name etc.) of various attributes of various object types, like order attribute/characteristic, which can be used in particular for compatibility type 200 and condition definitions.

Mainly, compatibility type consists of compatibility type numeric identifier 230 with description and two field identifiers from field catalogue 100, which represent (in)compatible combination of object attributes 210, 220. The linkage between field ID 230 and corresponding object attribute value is provided by field catalogue functionality.

All possible compatibility types 200 valid for particular business scenario are identified and defined at customizing step. In a specific example, the following compatibility types may be required:

01—transportation group—transportation group;
02—incoterm—incoterm;
03—vehicle—transportation group;
04—cross-docking location—transportation group.

Figure 2:
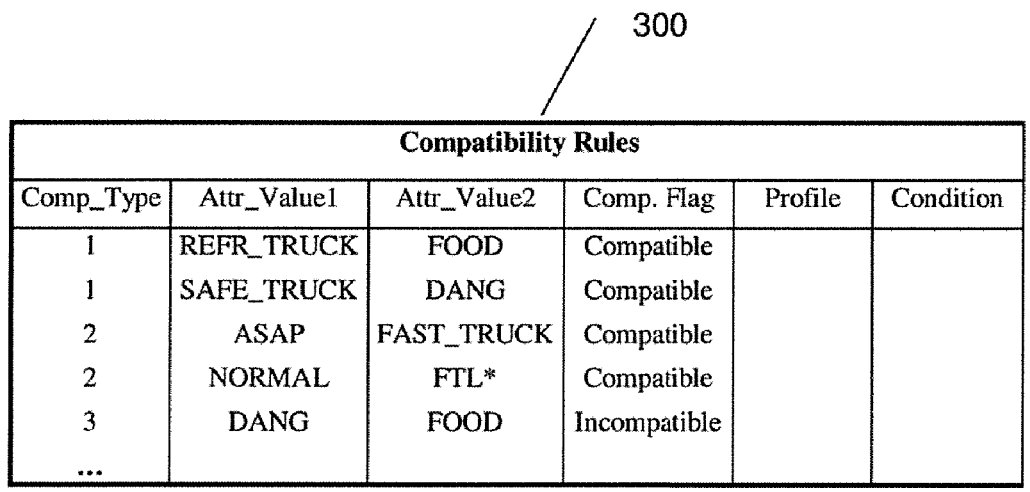
FIG. 2 illustrates the definition of compatibility rules.

A compatibility rule 300 (also denoted as "(in)compatibility") represents the actual combination of two values which refer to objects defined by compatibility type 200 and represents the objects which may be considered as (in)compatible in TPO (see FIG. 2). Specific compatibility rules 300 are based on compatibility types. In particular, possible first and second attribute values in compatibility rule should be consistent with first and second object types in compatibility type 200. For example, if first attribute of compatibility type 200 is cross-docking location 30, then first attribute values in corresponding rules 300 can only contain values which identify location. Nevertheless patterns can also be used to accelerate maintenance.

On planning/customizing step necessary compatibility rules 300 (incompatibilities) are maintained.

The linkage between attribute in compatibility type 300 and order attribute is realized in the way that attribute ID in field catalogue and therefore in compatibility type coincides with corresponding component in the structure of freight unit 10, or, represents vehicle 20, or, cross-docking location 30. Below, vehicles 10 are sometimes also denoted as means of transport. As freight unit structure 10 already contains most of shipping, product and other information of order, only one read of freight unit entry with compatibility attribute ID would be in most cases enough to get information, whether particular freight units contain (in)compatible attributes, and therefore should be handled correspondingly. In this way, not only any freight unit standard field can be used as possible (in)compatibility attribute, but also additional fields in customer include can be also used and processed automatically. If this is not the case (freight unit does not contain attribute), it is still possible to enter value for attribute in user exit provided by TPVS functionality.

Figure 3:
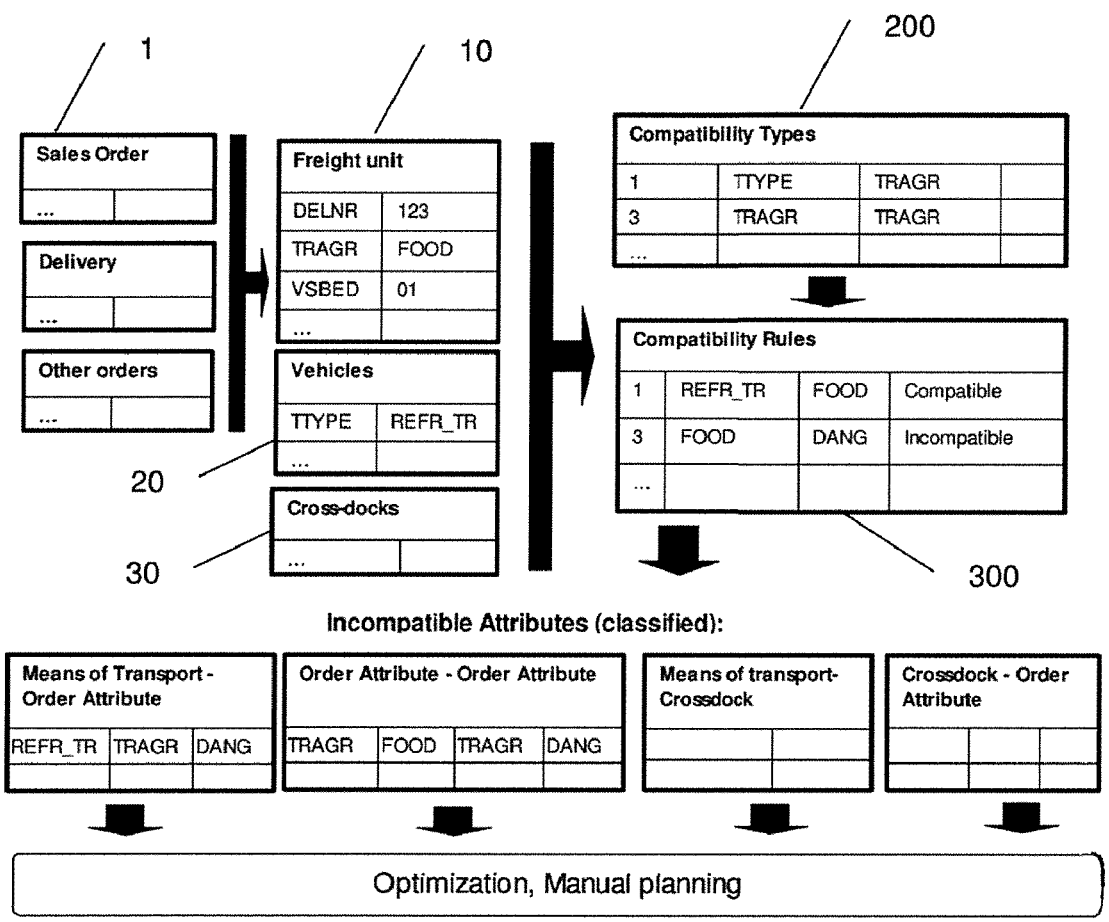
FIG. 3 illustrate the processing of compatibilities in TPO.

Technically, one function module is used as compatibility engine for retrieving and processing them. It gets orders (in form of freight units), vehicles 20 and cross-docking locations 30 as input objects (see FIG. 3). It provides output if form of incompatible combinations of attributes classified to four classes:

vehicle—order attribute
order attribute—order attribute
cross-docking location—order attribute
vehicle—cross-docking location.

These classes represent all possible combinations of incompatible objects, which are relevant for transportation.

This information can be later used by a transportation optimizer system, or in manual planning in similar way.

In addition to the incompatible attribute combinations, the optimizer also receives the attributes of all orders. One value is given for each order and possible attribute. All these attributes are described in a separate table.

The transportation optimizer has to determine feasible transportation plans, i.e. plans that satisfy all incompatibilities declared in above listed four classes. Advantageously, the approach according to the present invention provides rich modeling capabilities since many constraints involving several different order attributes can be declared by only these four incompatibility classes.

The question is how to solve this optimization problem efficiently, taking into account all different constraints and order attributes. The straightforward approach would be to extend the optimizer's internal search routines by introducing the order attributes and considering them explicitly during the search process. This approach has the drawback that the search logic of an existing optimizer system has to be changed. It is based on local search, which uses lots of different atomic moves. These moves perform small changes in an existing transportation plan, and the selection pressure of local search iteratively applies moves that reduce the costs of the current transportation plan. Thus, in order to consider order attributes inside this search process, they must be integrated into all moves. All this would cause a full revision of the internal search process. Furthermore, the search process would not exploit similarities or symmetries in the structure of the order attributes. Thus, search would solve a very general model, without exploiting special structural properties in the incompatibility structures. In general, this approach of integrating the attributes directly into all move causes high programming efforts and does not exploit structural dependencies that exist in most real-world transportation scenarios.

Therefore, the approach according to the invention is proposed based on preprocessing steps in the optimizer system, which reduce the model based on above four incompatibility classes to the core of the represented optimization problem. In this way, the problem stated as described above is transformed into an equivalent transportation optimization problem, which is modeled in a more compact fashion and in particular allows direct application of existing transportation optimizer software. This solution has the advantage that the internal search logic of the optimizer (i.e. the moves) is not affected at all and that the reduction already exploits all similarities and symmetries between order attributes and incompatibility constraints. Therefore a significantly lower programming effort is needed, as well as a concentration of the search process on the core of the optimization problem. The latter would cause additional efforts in the straightforward approach discussed before.

Figure 4:
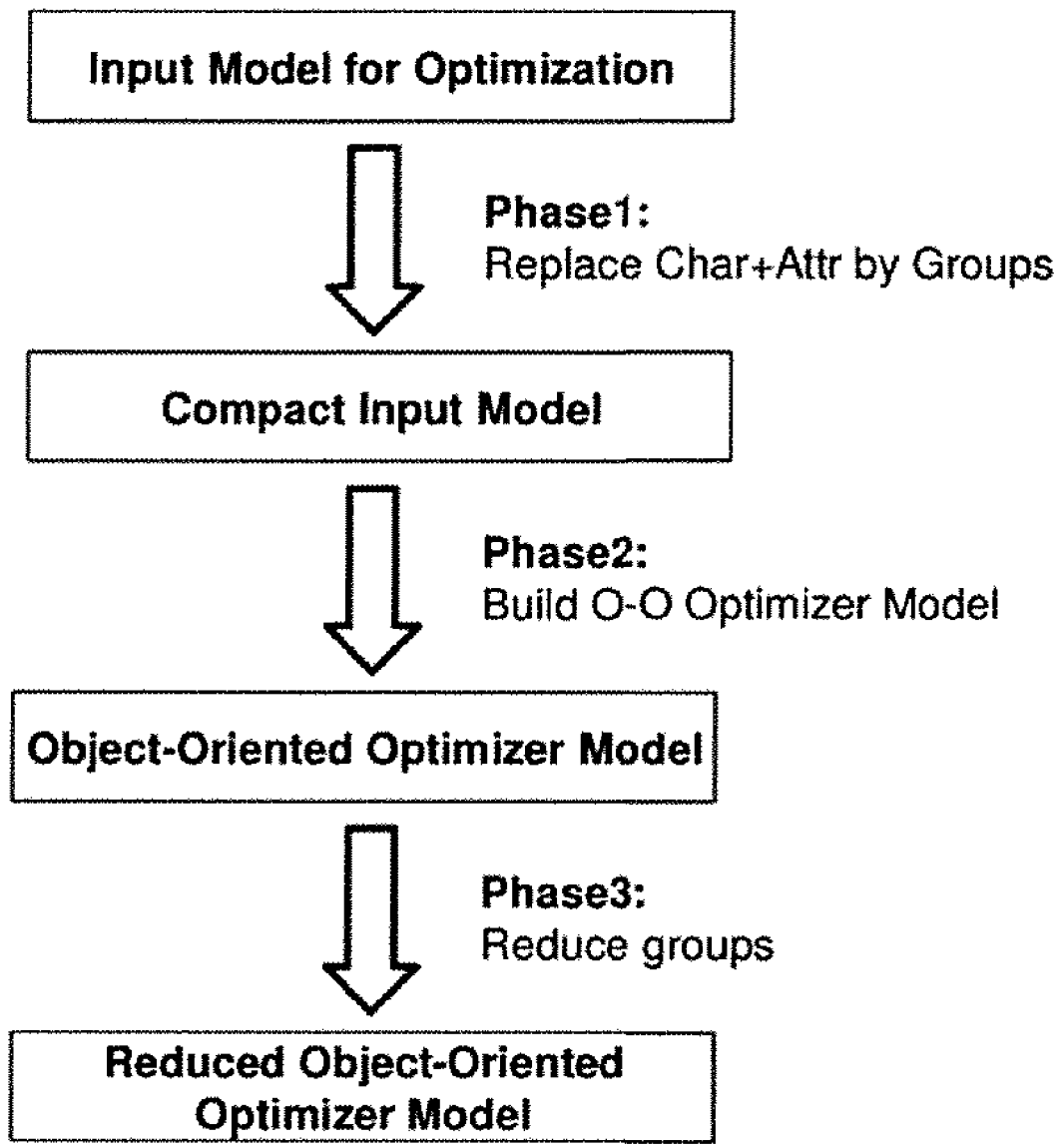
FIG. 4 illustrates an overview of the different phases of incompatibility reduction processing according to the invention.

The reduction step consists of several phases, which will be described in more detail. FIG. 4 gives an overview of the involved modeling layers and the phases that transform one layer into the subsequent one.

The phases have the following purpose:

Phase 1 shrinks the relational data. All attributes and values associated to each order are replaced by a single value for each order. This value is called group. As a result of the transformation, all orders with same group value have identical order characteristics, i.e. they have the same attributes and the same values of these attributes. The resulting model is more compact than the original input model for optimization.

Phase 2, which is optional, builds an object-oriented model, which is used for the internal optimizer search routines. It allows fast navigation between related objects (e.g. vehicles and orders) and quick access to the orders' properties (e.g. the group is directly accessible for each order). It contains some preprocessing steps that reduce the search efforts.

Phase 3 further reduces the incompatibility matrix, which stores for each pair of groups whether they are compatible or incompatible. Basically, this reduction replaces groups by equivalence classes of groups, where two groups are perceived as equivalent if they have the same incompatibility relations to all other groups. As a result, each order is associated to a reduced group. The number of reduced groups may be much smaller than the number of groups. This reduction reduces the whole incompatibility structure among groups to the core incompatibility structure, which cannot be further reduced by any technique.

Next, the four models and the three phases are described in more detail.

Figure 5:
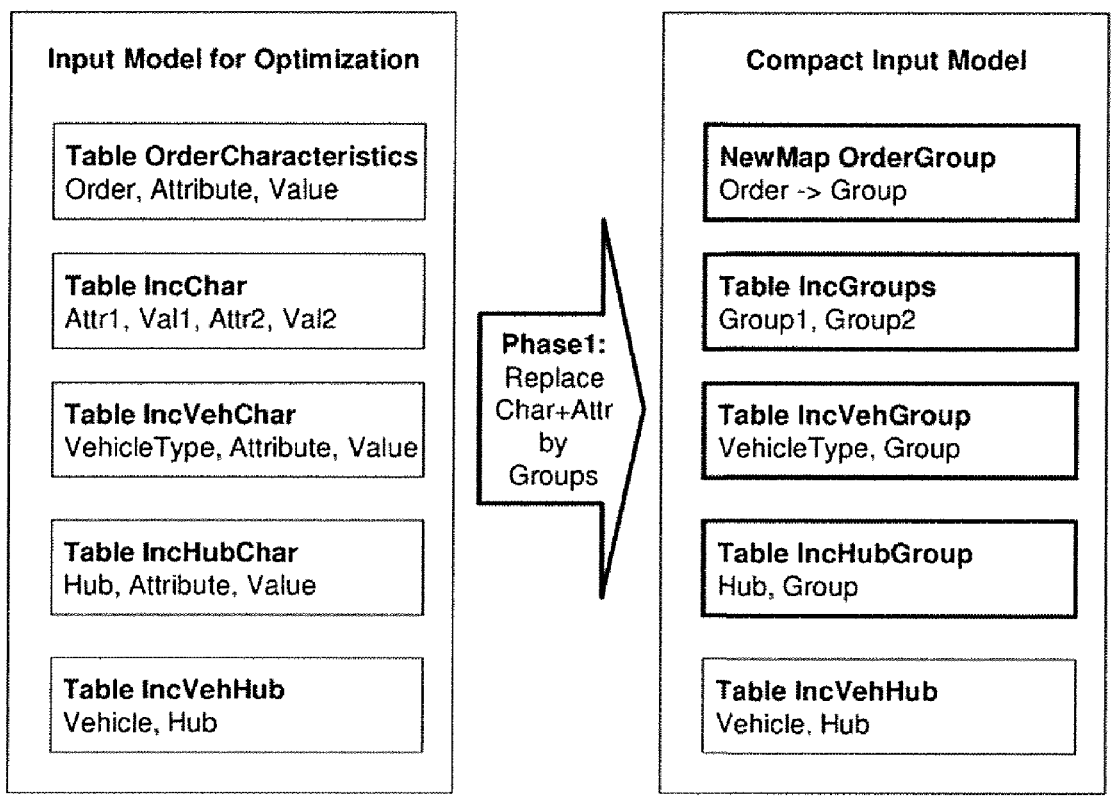
FIG. 5 illustrates the first phase of the reduction processing.

The first phase transforms the input model for optimization to the compact input model. FIG. 5 gives an overview. The input model for optimization is the output of the compatibility engine, enhanced by a table which specifies the order characteristics. The transportation optimizer of course gets lots of additional tables, like distance matrices, vehicle costs, time windows, etc., but here we describe only those involved in the processing of incompatibilities. The model consists of tables, each of which can be processed by looping over all rows contained. The compact input model basically consists of tables, but all characteristics associated to the orders are replaced by a single value associated to each order. This value is called group. All those orders that have exactly identical characteristics (i.e. the same set of attributes and the same values for each attribute) are assigned to the same group. Thus, a group represents a cluster of orders with identical properties.

Figure 6:
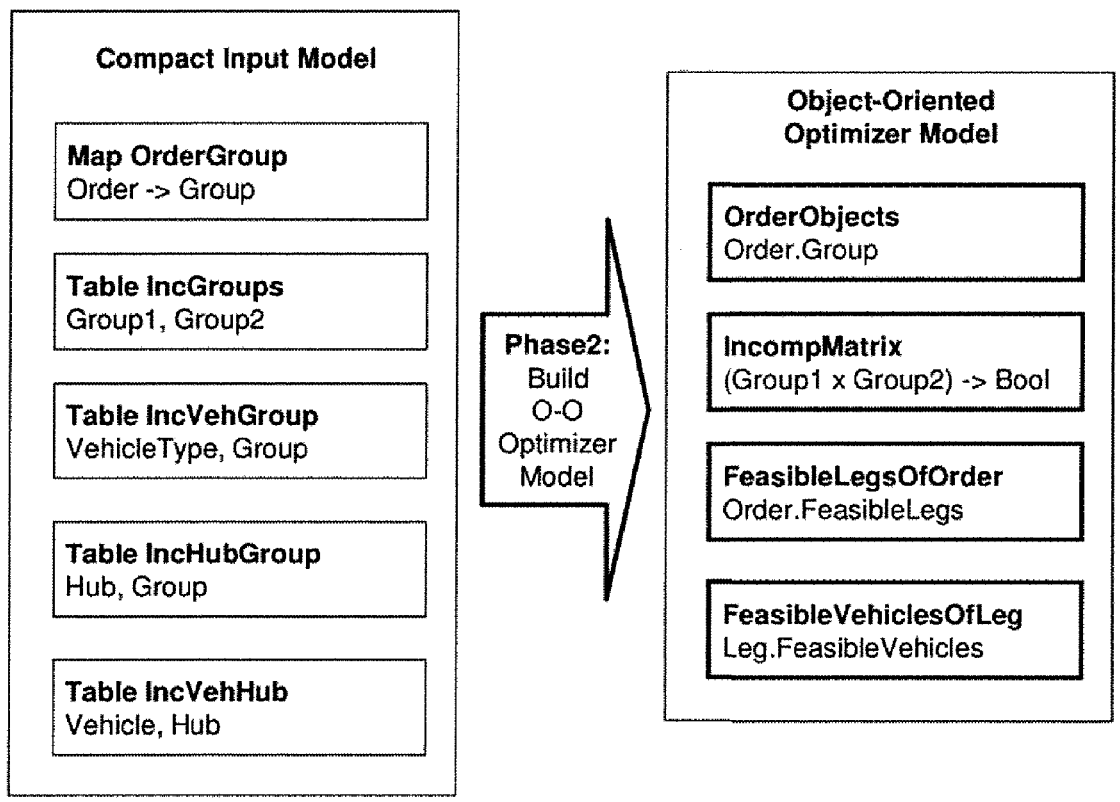
FIG. 6 illustrates the second phase of the reduction processing.

The second phase transforms the compact input model to the object-oriented optimizer model, as illustrated by FIG. 6. The object-oriented optimizer model is used in the search process of the optimizer. It is designed to allow fast access to properties of optimization objects like e.g. orders and vehicles. Furthermore, it allows navigation between related objects, e.g. all feasible vehicles are directly reachable from a given order. The incompatibility matrix allows determining whether two groups are compatible in a single step. For each order, the feasible legs are calculated. Among all possible legs those that violate incompatibility constraints are already filtered out. For each leg, all feasible vehicles are determined, also based on the incompatibilities declared.

Figure 7:
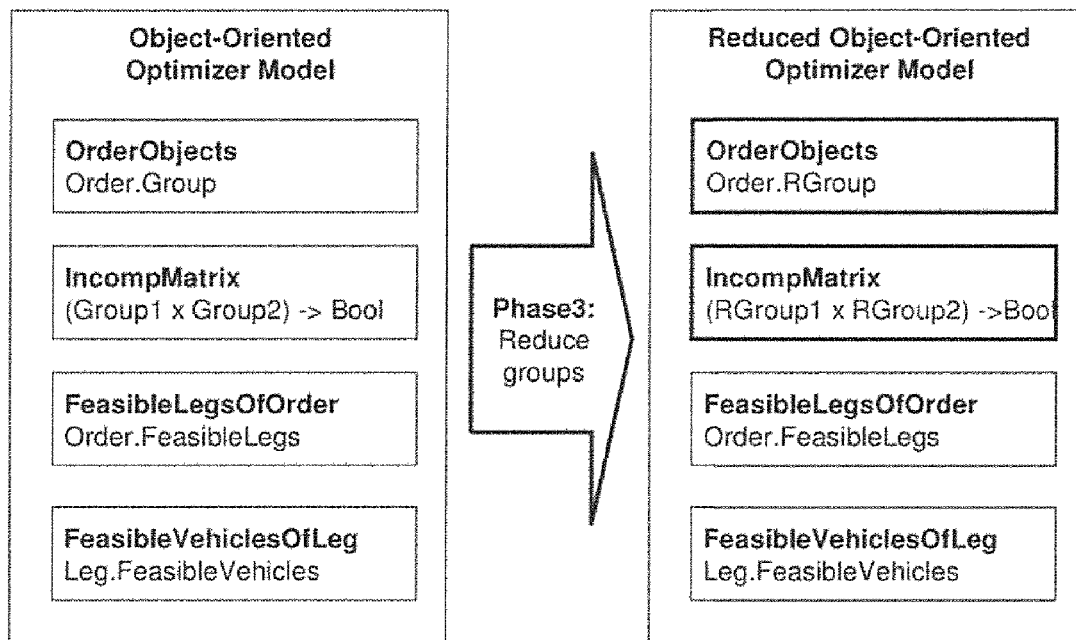
FIG. 7 illustrates the third phase of the reduction processing.
Figure 8:
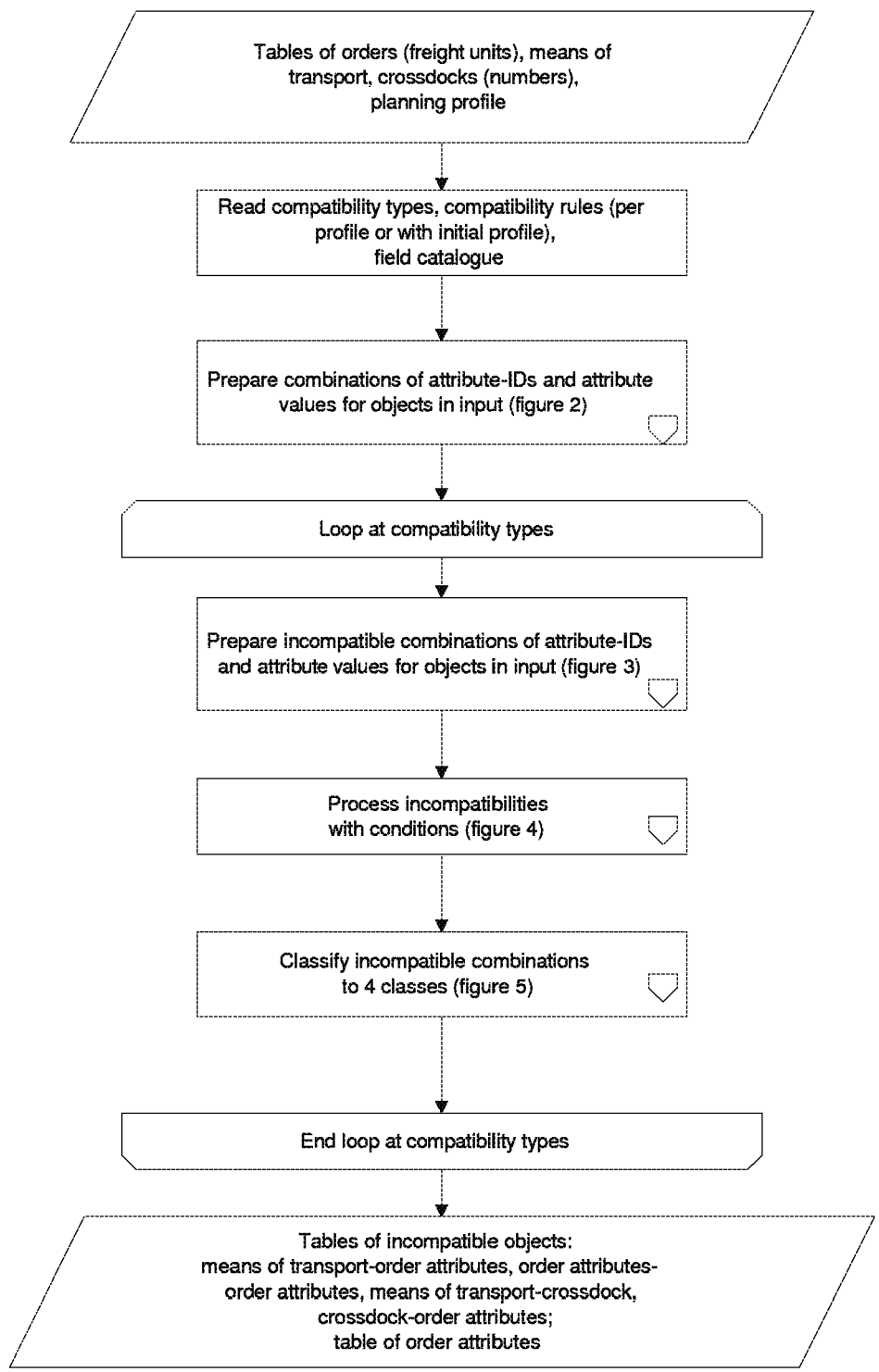
FIG. 8 illustrates a general diagram of compatibility processing.

The third phase transforms the object-oriented optimizer model to the reduced object-oriented optimizer model, as illustrated by FIG. 7. The object-oriented optimizer model is already suitable for the optimizer, i.e. it could be used to search for good transportation plans. However, there is still the possibility to reduce the model considerably. Therefore, the third phase analyzes the incompatibility matrix and detects equivalence classes among the groups. Then, all original groups in the object-oriented model are replaced by reduced groups (abbreviated by RGroup). This may yield a substantial reduction of the incompatibility matrix. This supports the optimizer's search process, since all orders, which are equivalent regarding their incompatibilities to other orders, now belong to the same (reduced) group. Thus, the optimizer can detect compatibility for all equivalent orders by simply comparing their RGroup. Without this reduction, this check would always be done by looking up in the incompatibility matrix, which is fast, but not as fast as directly comparing the RGroup attribute of the order objects.

In the following, the detailed design is described. Data types can be adjusted taking into account attribute identifiers, values, condition identifiers appropriate for a particular implementation. The only requirement is that the data type length should be wide enough to fit to maximum attribute value. The following notations are used:

it_<name>—input table;
et_<name>—output table;
lt_<name>—internal (local) table;
ls_<name>—work area of table with name <name>, or structure
lv<name>—local variable Definition of compatibility types—The existing TPVS field catalogue functionality is the basis for compatibility type definitions. Field catalogue contains attributes, which are related to planning objects, such as order, vehicle and cross-docking location.

The concept of compatibility type was introduced to represent possible (in)compatibility requirement for transportation scenarios. It's mainly consists of two attributes from field catalogue, which represent objects to be compatible or not.

Compatibility type database structure is as follows:

| Field name | Type(length) | Comment |
|---|---|---|
| COMP_TYPE | Long | ID of compatibility type (key field) |
| ATTR_ID1 | Char10 | ID of attribute 1 |
| ATTR_ID2 | Char10 | ID of attribute 2 |
| Description | Char60 | Description of compatibility type |

ATTR_ID1 and ATTR_ID2 fields are linked to TPVS field catalogue database table, field ATTR_ID through foreign key relationship. Therefore prerequisite of compatibility type definition is declaration of corresponding attributes in field catalogue.

Compatibility type's definition is part of customizing. During particular customer implementation projects, all possible compatibility types should be identified and defined.

Definition of compatibility rules—Compatibility rules (below—compatibilities) represent actual attribute values which identify possible (in)compatible object combinations. Compatibility definition is based on defined compatibility types.

Compatibility database table structure is as follows:

| Field name | Type(length) | Comment |
|---|---|---|
| ID | Long | Unique ID of entry (key field) |
| COMP_TYPE | Long | ID of compatibility type |
| ATTR_VALUE1 | Char40 | Value of attribute 1 |
| ATTR_VALUE2 | Char40 | Value of attribute 2 |
| COMP_FLAG | C | Compatibility Flag ('C', 'I', or initial) |
| PROFILE_ID | Char10 | Planning Profile identifier |
| CONDITION_ID | Char10 | Identifier of condition |

ATTR_VALUE1, 2 contain specific attribute values, which are (in)compatible (please refer to Example). The data type of these fields should be defined in such a way, that possible attribute values can be stored and unambiguously converted to/from them. In our design character type of length 40 was used, as it is sufficient to store any of order attribute values, relevant for APO, vehicle ID and cross-docking location numbers.

Compatibility flag COMP_FLAG can have values 'C'='Compatible', 'I'—'Incompatible', initial flag means that particular entry should be skipped. 'Compatible' flag means that all other possible values of second attribute in compatibility type, which were not declared as 'Compatible', will be incompatible (this is done to accelerate maintenance).

Conditions (existing functionality) can be used to restrict validity of corresponding compatibilities only for specific orders. Condition ID is unique identifier of corresponding condition definition, i.e. it is linked to condition header table through foreign key relationship.

Compatibility definition is part of planning process. In particular it is possible to define them directly during transportation planning.

Compatibility Engine—determination of compatibilities

Interface—input data: Input data contains planning objects which are relevant for determination of compatibilities. In particular these are orders, vehicle (IDs) and cross-docking location (numbers) (also often called hubs). Order table contains entries in form of order number, which uniquely identifies particular order in planning system, and all transportation-planning-relevant data, such as source and destination, delivery dates, quantities, shipping information, etc. Any order field is referred below as order attribute. Vehicle IDs and cross-docking location numbers are also referred below as attributes.

Input tables have following structure:

Orders it_order:

| Field name | Type(length) | Comment |
|---|---|---|
| ORDNO | Char10 | Order number |
| ... | | |
| TRAGR | Char10 | Transportation Group |
| ... other planning-relevant fields | | |

Vehicle it_ttype:

| Field name | Type(length) | Comment |
|---|---|---|
| TTYPE | Char10 | Vehicle ID |

Cross-docking location it_hub_loc:

| Field name | Type(length) | Comment |
|---|---|---|
| HUB_LOC | Char20 | Location number |

Interface—output data—Output contains incompatible attribute values, which are classified to 4 classes relevant for transportation, plus order attributes (in form of order number-attribute-ID-value combinations).

Output tables have following structure:

Incompatible vehicle-order attributes et_inc_ttype_ordattr:

| Field name | Type(length) | Comment |
|---|---|---|
| TTYPE | Char10 | Vehicle ID |
| ATTR_ID | Char10 | Order Attribute ID |
| ATTR_VALUE | Char40 | Order Attribute Value |

Incompatible order attribute-order attributes et_inc_ordattr_dattr:

| Field name | Type(length) | Comment |
|---|---|---|
| ATTR_ID1 | Char10 | Order Attribute 1 ID |
| ATTR_VALUE1 | Char40 | Order Attribute 1 Value |
| ATTR_ID2 | Char10 | Order Attribute 2 ID |
| ATTR_VALUE2 | Char40 | Order Attribute 2 Value |

Incompatible cross-docking location order attributes et_inc_hub_ordattr:

| Field name | Type(length) | Comment |
|---|---|---|
| HUB_LOC | Char20 | Cross-docking location number |
| ATTR_ID | Char10 | Order Attribute ID |
| ATTR_VALUE | Char40 | Order Attribute Value |

Incompatible vehicle-cross-docking location et_inc_ttype_hub:

| Field name | Type(length) | Comment |
|---|---|---|
| TTYPE | Char10 | Vehicle ID |
| HUB_LOC | Char20 | Cross-docking location number |

Order attributes et_ord_attr:

| Field name | Type(length) | Comment |
| --- | --- | --- |
| ORDNO | Char10 | Order number |
| ATTR_ID | Char10 | Order Attribute ID |
| ATTR_VALUE | Char40 | Order Attribute Value |

Important internal tables—Table of compatibility types lt_comp_types (the structure is identical to database table structure):

| Field name | Type(length) | Comment |
| --- | --- | --- |
| COMP_TYPE_ID | Long | ID of compatibility type |
| ATTR_ID1 | Char10 | ID of attribute 1 |
| ATTR_ID2 | Char10 | ID of attribute 2 |

Table of compatibility entries lt_comp_all, for specific compatibility type lt_comp (the structure is similar to database table structure, ID and planning profile fields are omitted for simplicity, as they are not used):

| Field name | Type(length) | Comment |
| --- | --- | --- |
| COMP_TYPE_ID | Long | ID of compatibility type |
| ATTR_VALUE1 | Char40 | Value of attribute |
| ATTR_VALUE2 | Char40 | Value of attribute |
| COMP_FLAG | C | Compatibility Flag ('C', 'I', or initial) |
| CONDITION_ID | Char10 | Identifier of condition |

Attribute ID table lt_attribute_ids:

| Field name | Type(length) | Comment |
| --- | --- | --- |
| ATTR_ID | Char10 | ID of attribute |

Table of attribute ID-value combinations for input objects lt_attr_id_values:

| Field name | Type(length) | Comment |
| --- | --- | --- |
| ATTR_ID | Char10 | ID of attribute |
| ATTR_VALUE | Char40 | Value of attribute |

Table of incompatible combinations of attribute ID-values lt_inc_attr_id_values:

| Field name | Type(length) | Comment |
| --- | --- | --- |
| ATTR_ID1 | Char10 | ID of attribute 1 |
| ATTR_VALUE1 | Char40 | Value of attribute 1 |
| ATTR_ID2 | Char10 | ID of attribute 2 |
| ATTR_VALUE2 | Char40 | Value of attribute 2 |
| CONDITION_ID | Char10 | Identifier of condition |

Table of condition IDs lt_condition_ids:

| Field name | Type(length) | Comment |
| --- | --- | --- |
| CONDITION_ID | Char 10 | Identifier of condition |

Table of assignments of orders to conditions lt_order_to_condition:

| Field name | Type(length) | Comment |
| --- | --- | --- |
| ORDNO | Char10 | Order number |
| CONDITION_ID | Char10 | Identifier of condition |

In the following, an algorithm of determination of incompatibilities is described. Reference is made to FIGS. 8-13. In these figures, compatibility entries are denoted as 'rules' for brevity.

1. Read compatibility types lt_comp_types, compatibility rules lt_comp_µl from corresponding database tables for current planning profile.
   At this step relevant compatibility types and compatibility rules should be read and passed to internal tables with structure identical with customizing database table structures. Table of used attribute IDs lt_attribute_ids is filled by looping over compatibility types lt_comp_types and adding attribute Ids, ATTR_ID1 and ATTR_ID2 to it.
2. Prepare attribute ID-value combinations for input objects lt_attr_id_values (see FIG. 9).
   At this step combinations of attribute IDs and values are prepared for input objects in form of attribute ID—value pairs.
   2.1 Loop at table of attribute IDs lt_attribute_ids into lv_attribute_id;
   2.1.1. determine, what object attribute ID refers to (order, vehicle, cross-docking location). In our design the reference is hard-coded, in particular, attribute with ID='TTYPE' always refers to vehicle, 'HUB_LOC'—to cross-docking location, any other attribute—to order attribute.
   Case Object Type:
   2.1.2.1. vehicle—loop at vehicle table it_ttype into ls_ttype and for each entry add entry with
   ATTR_ID=lv_attribute_id ('TTYPE')
   ATTR_VALUE=is_ttype-ttype;
   2.1.2.2. cross-docking location—loop at cross-docking location input table it_hub_loc into ls_hub_loc and for each entry add entry with
   ATTR_ID=lv_attribute_id ('HUB_LOC'),
   ATTR_VALUE=is_hub_loc-hub_loc;
   2.1.2.3. order—loop at order input table it_orders, for each entry get value of attribute by:
   2.1.1.3.1. calling user exit
   2.1.1.3.2. accessing order structure using component name=lv_attribute_id as reference, if user exit is not active
   2.1.1.3.3. if failed, add error message to log and process next order
   2.1.1.3.4. add entry with ATTR_ID=lv_attribute_id, ATTR_VALUE=returned value of order attribute 3. Loop at compatibility types lt_comp_types into ls_comp_type.

3.1 Prepare compatibility entries of current type lt_comp using table lt_comp_all.

Figure 10:
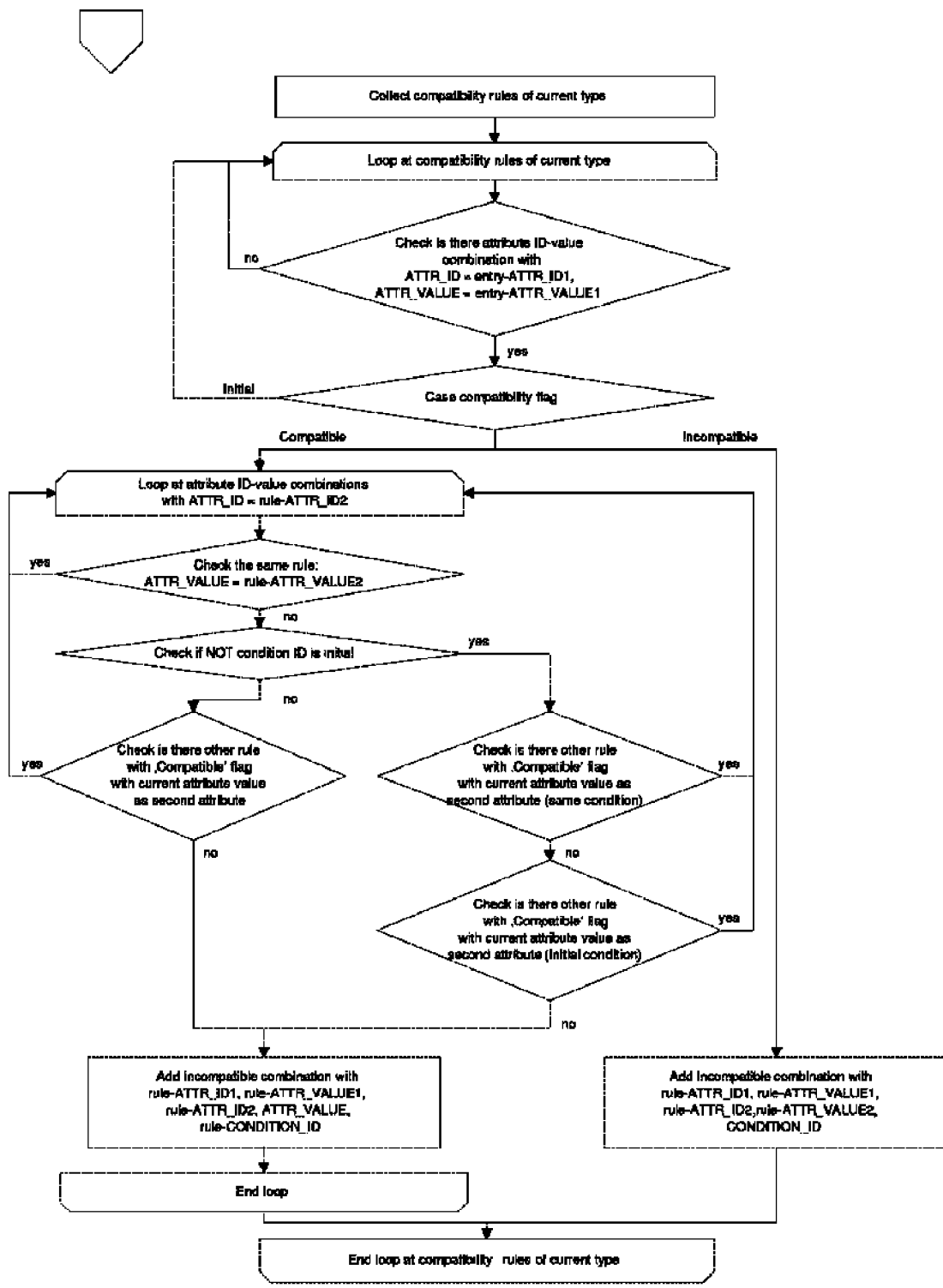
FIG. 10 illustrates the subprocess of preparing incompatible combinations.
Figure 11:
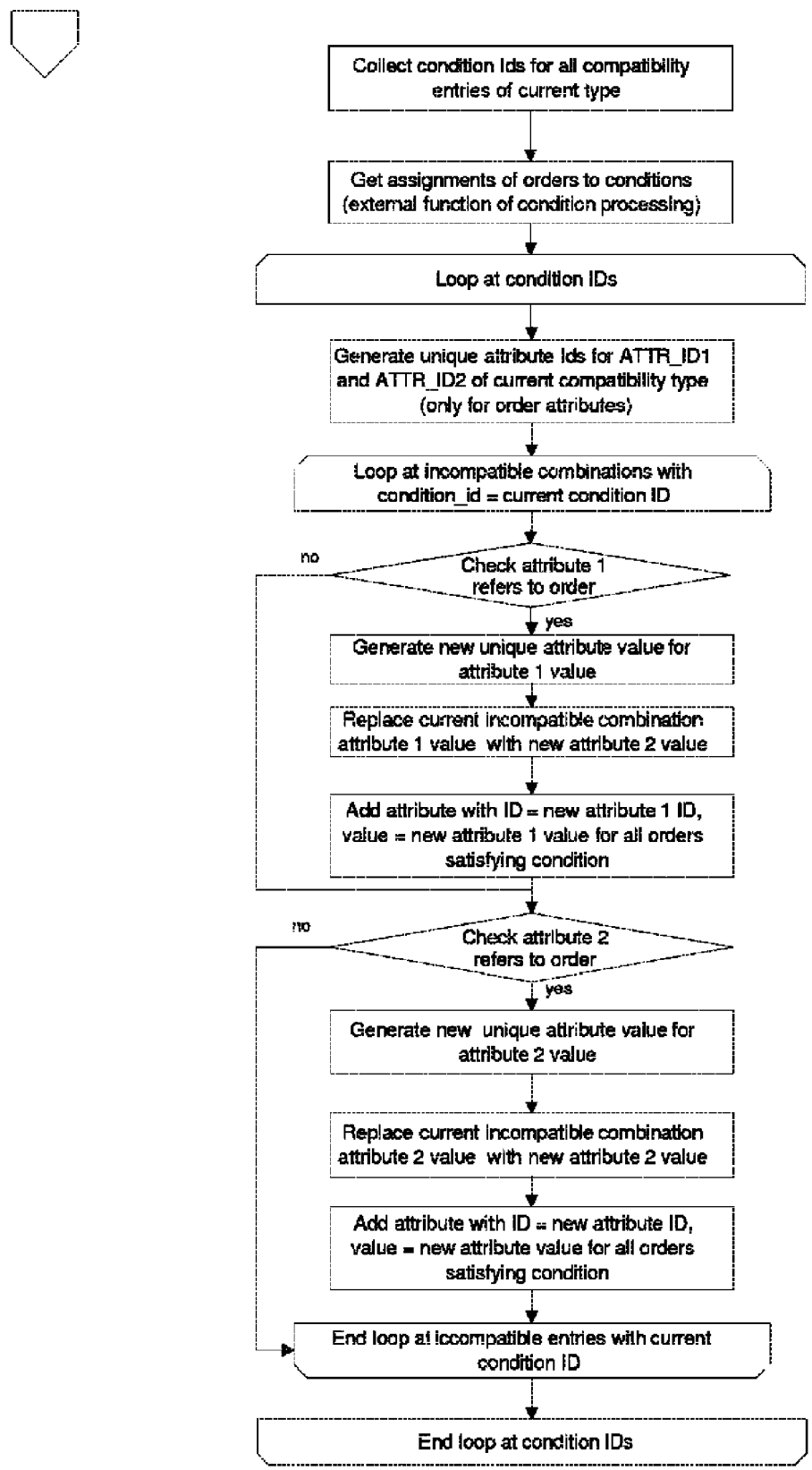
FIG. 11 illustrates the subprocess of processing incompatibilities with conditions.
Figure 12:
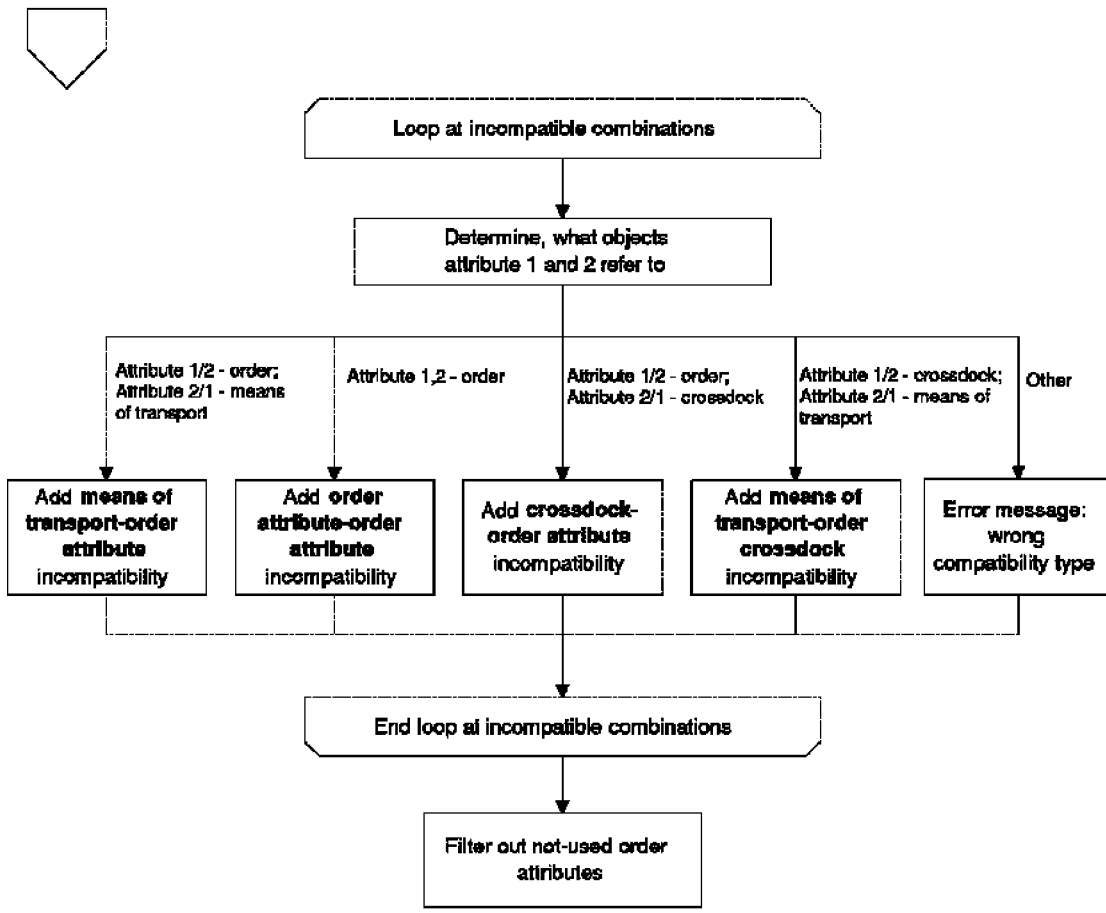
FIG. 12 illustrates the subprocess of classifying incompatible combinations to 4 classes.

3.2 Prepare incompatible combinations of attribute values (see FIG. 10).

Loop at compatibility entries of current type lt_comp into ls_comp.

Check if entry in table lt_attr_id_values with key ls_comp-ATTR_ID1, ls_comp-ATTR_VALUE1 exists;

If FALSE, process next compatibility entry;

3.2.1. Case compatibility flag (ls_comp-COMP_FLAG):

3.2.1.1. 'C' (Compatible).

In this case it is necessary enter all other attribute values as incompatible, which are not explicitly declared as compatible.

3.2.1.1.1. Loop at lt_attr_id_values into ls_attr_id_values where ATTR_ID=ls_comp_type-ATTR_ID2

3.2.1.1.1.1. Check if ls_attr_id_values-ATTR_VALUE=ls_comp-ATTR_VALUE2 (same rule).

If TRUE, process next compatibility entry.

3.2.1.1.1.2. It is necessary to check if particular attribute value is entered as compatible in another compatibility entry with the same condition or without condition. For entry with condition it is necessary to check another entries either with same condition ID, or with initial condition ID. For entry without condition, it is necessary to check another entries with any condition or without it.

3.2.1.1.1.3. Check if NOT ls_comp-CONDITION_ID is initial.

3.2.1.1.1.4. If TRUE 3.2.1.1.1.4.1. Check entry in table lt_comp with key
ATTR_VALUE1=ls_comp-ATTR_VALUE1
ATTR_VALUE2=ls_attr_id_values-ATTR_VALUE
COMP_FLAG='C'
CONDITION_ID=ls_comp-CONDITION_ID
exists.

If TRUE, process next compatibility entry.

3.2.1.1.1.4.2. Check entry in table lt_comp with key
ATTR_VALUE1=ls_comp-ATTR_VALUE1
ATTR_VALUE2=ls_attr_id_values-ATTR_VALUE
COMP_FLAG='C'
CONDITION_ID=0
exists.

If TRUE, process next compatibility entry.

3.2.1.1.1.5. ELSE 3.2.1.1.1.5.1. check entry in table lt_comp with key
ATTR_VALUE1=ls_comp-ATTR_VALUE1
ATTR_VALUE2=ls_attr_id_values-ATTR_VALUE
COMP_FLAG='C'
exists.

If TRUE, process next compatibility entry.

3.2.1.1.1.6. Check entry in table lt_comp with key
ATTR_VALUE1=ls_comp-ATTR_VALUE1
ATTR_VALUE2=ls_attr_id_values-ATTR_VALUE
COMP_FLAG='C'
CONDITION_ID=0
exists.

If TRUE, process next compatibility entry.

3.2.1.1.1.7. Add incompatible combination entry to table lt_inc_attr_id_values:
ATTR_ID1=ls_comp-ATTR_ID1
ATTR_VALUE1=ls_comp-ATTR_VALUE1
ATTR_ID2=ls_comp-ATTR_ID2
ATTR_VALUE2=ls_attr_id_values-ATTR_VALUE
CONDITION_ID=ls_comp-CONDITION_ID 3.2.1.1.2. End loop at lt_attr_id_values.

3.2.1.2. 'I' (incompatible)

Append incompatible combination entry to table lt_inc_attr_id_values:
ATTR_ID1=ls_comp-ATTR_ID1
ATTR_VALUE1=ls_comp-ATTR_VALUE1
ATTR_ID2=ls_comp-ATTR_ID2
ATTR_VALUE2=ls_comp-ATTR_VALUE
CONDITION_ID=ls_comp-CONDITION_ID 3.2.1.3. Initial process next compatibility entry.

3.3. End loop at lt_comp.

3.4. Process incompatibilities with conditions (see FIG. 11).

3.4.1. Loop at incompatible attributes of current type lt_inc_uttr_id_values into ls_inc_attr_id_values where CONDITION_ID is NOT initial.

3.4.1.1. Append ls_attr_id_values-CONDITION_ID to lt_condition_ids.

3.4.2. End loop.

3.4.3. Read assignments of orders to conditions lt_order_to_condition (external function of condition processing).

3.4.4. Loop at lt_condition_ids into ls_condition_id.

For each condition a unique virtual attribute ID and value for order is generated. If order satisfies condition, then it has corresponding virtual attribute ID-value combination. Incompatibilities with conditions are converted to incompatibilities between virtual attributes.

3.4.4.1. Generate new attribute ID lv_new_attribute_id1 for attribute 1 of current compatibility type ls_comp_type-ATTR_ID1, if attribute 1 refers to order (see 2.1.1).

3.4.4.2. Generate new attribute ID lv_new_attribute_id2 for attribute 2 of current compatibility type ls_comp_type-ATTR_ID2, if attribute 1 refers to order (see 2.1.1).

In our design, new attribute ID is constructed by concatenation of attribute ID and condition ID (see example).

3.4.4.3. Loop at incompatible attributes of current type lt_inc_attr_id_values into ls_inc_attr_id_values where CONDITION_ID=ls_condition_id.

3.4.4.3.1. Generate new attribute value lv_new_attribute_value1 for ls_inc_attr_id_values-ATTR_VALUE1, if attribute 1 of current compatibility type refers to order.

In our design, new attribute value is constructed by concatenation of attribute value and condition ID (see example).

3.4.4.3.2. Replace entry ls_inc_attr_id_values-ATTR_VALUE1 in lt_inc_attr_id_values with new value lv_new_attribute_value1

3.4.4.3.3. Append generated attribute for orders which satisfy current condition:

3.4.4.3.3.1. Loop at lt_order_to_condition into ls_order_to_condition where condition_id=ls_condition_id.

3.4.4.3.3.1.1. Append order attribute to table et_ord_attr:
ORDNO=ls_order_to_condition-ORDNO
ATTR_ID=ls_new_attribute_id1
ATTR_VALUE=lv_new_attribute_value1
if attribute 2 of current compatibility type refers to order.

3.4.4.3.3.2. End loop at lt_order_to_condition.

3.4.4.3.4. Generate new attribute value lv_new_attribute_value2 for ls_inc_attrid_values-ATTR_VALUE2, if attribute 2 of current compatibility type refers to order.

In our design, new attribute value is constructed by concatenation of attribute value and condition ID (see example).

3.4.4.3.5. Replace entry ls_inc_attr_id_values-ATTR_VALUE2 in lt_inc_attr_id_values with new value lv_new_attribute_value2

3.4.4.3.6. Add generated attribute for orders which satisfy current condition.
3.4.4.3.6.1. Loop at lt_order_to_condition into ls_order_to_condition where condition_id=ls_condition_id.
3.4.4.3.6.1.1. Append order attribute to table et_ord_attr:
ORDNO=ls_order_to_condition-ORDNO,
ATTR_ID=lv_new_attribute_id2,
ATTR_VALUE=lv_new_attribute_value2,
if attribute 2 of current compatibility type refers to order.
3.4.4.3.6.2. End loop at lt_order_to_condition.
3.4.4.4. End loop at lt_inc_attr_id_values.
3.4.5. End loop at lt_condition_ids.
3.5. Classify incompatibilities into 4 classes (see FIG. 12).
3.5.1. Loop at lc_attr_id_values into ls_inc_attr_id_values.
3.5.1.1. Determine, what object attributes 1 and 2 refer to (order, vehicle, cross-docking location) (see 2.1.1).
3.5.1.2. Case ATTR_ID1-ATTR_ID2 (object combination):
3.5.1.2.1. Vehicle—Order attribute, or Order Attribute—Vehicle. Append entry to et_inc_ttype_ordattr:
TYPE=ls_inc_attr_id_values-ATTR_VALUE1
ATTR_ID=ls_inc_attr_id_values-ATTR_ID2
ATTR_VALUE=ls_inc_attr_id_values-ATTR_VALUE2
3.5.1.2.2. Order attribute—Order attribute. Append entry to et_inc_ordattr_ordattr:
ATTR_ID1=ls_inc_attr_id_values-ATTR_ID1
ATTR_VALUE1=ls_inc_attr_id_values-ATTR_VALUE1
ATTR_ID2=ls_inc_attr_id_values-ATTR_ID2
ATTR_VALUE2=ls_inc_attr_id_values-ATTR_VALUE2
3.5.1.2.3. cross-docking location—Order attribute, or Order Attribute—cross-docking location. Append entry to et_inc_hub_ordattr:
HUB_LOC=ls_inc_attr_id_values-ATTR_VALUE1
ATTR_ID=ls_inc_attr_id_values-ATTR_ID2
ATTR_VALUE=ls_inc_attr_id_values-ATTR_VALUE2
3.5.1.2.4. Vehicle—cross-docking location, or cross-docking location—vehicle. Append entry to et_inc_tope_hub:
TTYPE=ls_inc_attr_id_values-ATTR_VALUE1
HUB_LOC=ls_inc_attr_id_values-ATTR_VALUE2
3.5.1.2.5. Other combination—error message 'Wrong compatibility type'.
3.5.2. End loop at lt_inc_attr_id_values.
3.5.3. Filter out not-used order attributes.
3.5.3.1. Loop at et_ord_attr into ls_ord_attr.
3.5.3.1.1. Read table lt_inc_attr_id_values with key
ATTR_ID1=ls_ord_attr-ATTR_ID,
ATTR_VALUE1=ls_ord_attr-VALUE.
If entry found, process next ls_ord_attr.
3.5.3.1.2. Read table lt_inc_attr_id_values with key
ATTR_ID2=ls_ord_attr-ATTR_ID,
ATTR_VALUE2=ls_ord_attr-VALUE.
If entry found, process next ls_ord_attr.
3.5.3.1.3. Delete current order attribute from et_ord_attr.
3.5.3.2. End loop at et_ord_attr.
4. End loop at lt_comp_types.

Optimizer Preprocessing of Incompatibilities—In the following, the terms order characteristic and order attribute will be used as synonyms.

Characteristics-based clustering of orders into groups—The main task is to determine orders which have identical characteristics, and put them together into a group. Basically, the key input for this phase is the table that declares the orders' characteristics. Due to a mapping of strings to consecutive integers, the following (numeric) structure is assumed:

| Field name | Type(length) | Comment |
| --- | --- | --- |
| ORDER | Int | Order number (ID) |
| CHAR | Int | Characteristic (ID) |
| VAL | Int | Value (ID) |

Orders, characteristics and values are numbered consecutively, starting by 1. A row of this table has the semantic that the order with ID ORDER has the value VAL regarding its attribute CHAR.

The following algorithm determines clusters of orders. A cluster is a set of orders, which have (i) the same set of attributes, and (ii) the same value for each declared attribute, respectively. We use the following notation: M:A->B is a mapping from A to B. |M| is the number of elements from A that are mapped to B.

Algorithm Clustering:
Let clust: (char->val)->orders be a mapping that maps mappings (char->val) to a list of orders. Initially, clust is empty, i.e. |clust|=0.
For each order do
begin
Let m: char->val be a mapping that is empty, i.e. |m|=0.
  For each (char,val) declared for the order do
    Set m(char)=val.
  If clust already contains m then
    Append order to clust(m).
  else
    Set clust(m)=(order).
end
Set counter=1.
For all mappings (char->val) in clust do
  Assign all orders in the list clust(char->val) to the group counter.
Assign the group 0 to all orders not assigned to any group in previous loop.
End Algorithm Clustering:

It should be noted that this is high-level pseudo-code. Its purpose is to clarify the basic idea. Of course, several additional maps may be required to implement this algorithm efficiently. In particular, processing of orders requires several inverse maps that determine for a given characteristic and value all corresponding groups. All the intermediate results of this algorithm are stored in maps, which can be efficiently accessed by the next transformation steps. The two loops listed in the algorithm can be unified into a single loop, which is even more efficient.

In the exemplary implementation of the algorithm, several checks of the input data are included, which immediately report errors or inconsistencies in the input data, like e.g. the inconsistent declaration of several values for one characteristics of one order.

Build Object-Oriented Optimizer Model—The core optimizer engine of our IPO uses an object-oriented model, where the different objects are linked and the information needed is better accessible than in a relational-table based model.

Four objects are relevant in connection with (in)compatibilities:
  The OrderObject stores the OrderGroup computed in the previous step when clustering the order characteristics with their values into compact groups. Later in the process this object also stores the reduced group determined during building equivalence classes. Additionally, the OrderObject of course stores all other relevant information of the orders contained in other input tables, which aren't relevant for (in)compatibilities.
  The second object is the incompatibility matrix which is another representation of the table of incompatibilities between OrderGroups.

The other two objects, the FeasibleLegsOfOrder and FeasibleVehiclesOfLeg combine information of (in)compatibilities between vehicle and orders, orders and hubs and hubs and vehicle, using the hub structure and available vehicle of the underlying optimization problem (given in some of the other input tables).

The (feasible) legs of an order depend on the hub-network of the problem. We can have a 'direct leg' connecting the pickup location (depot, plant, etc) directly with the delivery location (customer, etc) of the order. If hubs are available, there is the possibility to reload the order at these cross-docking locations. There exist legs from the pickup location to the reachable hubs, legs from some of the hubs to the delivery location and of course there may exist some legs between some of the hubs.

Entries in the incompatibilities table between orders and hubs lead directly to the elimination of some of the legs, namely of those where one of the two locations is an incompatible hubs for the order.

Each of the leg can be served by some vehicles; some vehicles may not reach some hubs because of the corresponding distance matrix (e.g. a ship can only serve some harbors but no airports, the distance from the harbors to the airport were set to infinite). Additionally some incompatibilities between hubs and vehicle may be maintained in the corresponding table, which lead to a further elimination of vehicle at the legs where the specified hub is involved.

If some vehicles are not compatible to a specific order, these vehicles are not usable at any of the legs of the order, which means that they must be deleted from all FeasibleVehiclesOfLeg-Objects of the feasible legs of the order. As a result, for some legs no feasible vehicle may be left, which causes the infeasibility of the leg. In such case, the leg can be removed from the set of FeasibleLegsOfOrder. Moreover, all legs which can't be extended with any other feasible legs to an edge path from the pickup to the delivery location of the order can also be removed, since they cannot be used to perform the order.

An example of the transformation to the object-oriented optimization model is given in the example section for optimizer preprocessing.

Build Reduced Groups—It may happen that some of the OrderGroups are in the same equivalence class regarding incompatibilities with other OrderGroups, e.g. some groups are compatible with all other groups, or one OrderGroup is incompatible to several other groups which have no further incompatibilities. Some other OrderGroups may not be in use since e.g. the orders using the OrderGroups cannot be performed at all or in the case of decomposing the problem into smaller subproblems the corresponding orders are not selected to be optimized in the current decomposed subproblem. Building these equivalence classes helps to reduce the size of the incompatibility matrix, which leads to a better performance when checking for incompatibility between orders and other orders or hubs or vehicle.

We assume an incompatibility matrix with entries 'compatible' and 'incompatible' for each of the order groups. The incompatibility matrix has two important characteristics:
for all OrderGroups g: g compatible g
symmetry (g1 compatible g2 if and only if g2 compatible g1)

In the further search only those OrderGroups must be considered, which are present in the current subproblem in at least one performable order. The incompatibility matrix can therefore be reduced by eliminating the unnecessary OrderGroups, which can be done by eliminating the corresponding rows and columns from the incompatibility matrix.

The next step is to detect OrderGroups with identical incompatibilities, which belong to the same equivalence class and can be treated as one single virtual incompatibility group (further called 'RGroup', abbreviated from ReducedGroup).

To detect the equivalence classes one has to compare the reduced rows (or columns because of the symmetry) of the incompatibility matrix. Each two identical rows belong to the same equivalence class, because they have the same incompatible OrderGroups. Each equivalence class defines an RGroup. The incompatibility matrix can now be reduced furthermore. For each of the equivalence classes, one reference member of the group with its corresponding row and column will remain in the incompatibility matrix, while the rows and columns for the other members of the RGroup will be deleted.

The remaining incompatibility matrix (with at least one row and column) is the core incompatibility matrix, which can't be reduced any more. Every two rows (and columns) are pair wise different.

Finally the OrderGroups in the orders have to be updated/replaced by the mapped RGroups.

Algorithm for the reduction (not including updates of OrderGroups):
input:
  incompatibility matrix of the OrderGroups
  selected performable orders
output:
  mapping of OrderGroups to RGroups
  incompatibility matrix of the RGroups
begin
  Eliminate not used OrderGroups in the matrix by deleting corresponding rows and columns
  Build equivalence classes (rows and columns) which are identical belong to the same equivalence class)
  Assign new RGroup to each equivalence class
  Shrink incompatibility matrix according to equivalence classes end In the following, an example of compatibility definitions and processing is given.

A typical transportation scenario includes following requirements:
1. Orders of certain transport groups should not be combined onto the same shipment.
In particular, transport group FOOD is not compatible with ELECTRONICS.
2. Certain vehicle should be used for orders of specific shipping conditions.
I.e. vehicle FEDEX should be used for orders of shipping conditions 01, for orders of shipping conditions 02 vehicle DHL may be used, if order destination is USA, TNT—if order destination is EUROPE, for other destinations there are no specific requirements.

Customizing—Field catalogue contains following fields:

| Attr_ID | Field Text |
| --- | --- |
| TRAGR | Transport Group |
| TTYPE | Vehicle |
| VSBED | Shipping Conditions |
| ... | |

The following compatibility types are created:
1 transport group—transport group
2 shipping conditions—vehicle.
In this case Compatibility Types database contains following entries:

| Comp_Type_ID | ATTR_ID1 | ATTR_ID2 | Type Text |
| --- | --- | --- | --- |
| 1 | TRAGR | TRAGR | Transport group - transport group |
| 2 | VSBED | TTYPE | Shipping conditions - vehicle |

Setup of compatibility rules—Following compatibility rules are created (I=incompatible, C=compatible):

| Comp_Type_ID | ATTR_Value1 | ATTR_Value2 | Comp-Flag | Profile | Condition_ID |
|---|---|---|---|---|---|
| 1 | FOOD | ELECTRONICS | I | | |
| 2 | 01 | FEDEX | C | | |
| 2 | 02 | DHL | C | | USA |
| 2 | 02 | TNT | C | | EUR |

Here condition USA corresponds to orders with destination USA, condition EUR corresponds to orders with destination EUROPE.

Determination of Incompatibilities

Input data—Suppose that here are following orders and vehicle during transportation planning:

Order Data:

| Ordno | ... | Tragr | Vsbed | Destination | ... |
|---|---|---|---|---|---|
| 0011 | | FOOD | 01 | EUROPE | |
| 0012 | | FOOD | 01 | USA | |
| 0013 | | FOOD | 02 | USA | |
| 0014 | | FOOD | 02 | EUROPE | |
| 0021 | | ELECTRONICS | 01 | EUROPE | |
| 0022 | | ELECTRONICS | 01 | USA | |
| 0023 | | ELECTRONICS | 02 | USA | |
| 0024 | | ELECTRONICS | 02 | EUROPE | |
| 0025 | | ELECTRONICS | 02 | ASIA | |
| 0026 | | ELECTRONICS | 03 | USA | |

Vehicle Data:

| Ttype | ... | Description | ... |
|---|---|---|---|
| FEDEX | | Fedex | |
| DHL | | DHL | |
| TNT | | TNT | |
| UPS | | UPS | |

Contents of important internal tables at processing steps described in process diagram.

Attribute ID table lt_attribute_ids:

| ATTR_ID |
|---|
| TRAGR |
| VSBED |
| TTYPE |

Table of attribute ID-value combinations for input objects lt_attr_id_values:

| ATTR_ID | ATTR_VALUE |
|---|---|
| TRAGR | FOOD |
| TRAGR | ELECTRONICS |
| VSBED | 01 |
| VSBED | 02 |
| VSBED | 03 |
| TTYPE | FEDEX |
| TTYPE | DHL |
| TTYPE | TNT |
| TTYPE | UPS |

Step 1 of loop at compatibility types, compatibility type=1.

Table lt_inc_attr_id_values of incompatible combinations of attribute ID—values.

| ATTR_ID1 | ATTR_Value1 | ATTR_ID2 | ATTR_Value2 | Condition_ID |
|---|---|---|---|---|
| TRAGR | FOOD | TRAGR | ELECTRONICS | |

Condition processing is not relevant, as they are not defined for compatibility rules of compatibility type 1.

Tables of incompatibilities after classification of incompatible entries et_inc_ordattr_ordattr:

| Attr_ID1 | Attr_Value1 | Attr_ID2 | Attr_Value2 |
|---|---|---|---|
| TRAGR | FOOD | TRAGR | ELECTRONICS |

Order attributes to be appended to et_ord_attr:

| Ordno | Attr_ID1 | Attr_Value1 |
|---|---|---|
| 0011 | TRAGR | FOOD |
| 0012 | TRAGR | FOOD |
| 0013 | TRAGR | FOOD |
| 0014 | TRAGR | FOOD |
| 0021 | TRAGR | ELECTRONICS |
| 0022 | TRAGR | ELECTRONICS |
| 0023 | TRAGR | ELECTRONICS |
| 0024 | TRAGR | ELECTRONICS |

-continued

| Ordno | Attr_ID1 | Attr_Value1 |
|---|---|---|
| 0025 | TRAGR | ELECTRONICS |
| 0026 | TRAGR | ELECTRONICS |

Step 2 of loop at compatibility types, compatibility type=2.
lt_inc_attr_id_values—before condition processing:

| ATTR_ID1 | ATTR_Value1 | ATTR_ID2 | ATTR_Value2 | Condition_ID |
|---|---|---|---|---|
| VSBED | 01 | TTYPE | DHL | |
| VSBED | 01 | TTYPE | TNT | |
| VSBED | 01 | TTYPE | UPS | |
| VSBED | 02 | TTYPE | FEDEX | USA |
| VSBED | 02 | TTYPE | TNT | USA |
| VSBED | 02 | TTYPE | UPS | USA |
| VSBED | 02 | TTYPE | FEDEX | EUR |
| VSBED | 02 | TTYPE | DHL | EUR |
| VSBED | 02 | TTYPE | UPS | EUR | lt_condition_ids:

| Condition_ID |
|---|
| USA |
| EUR |

Table lt_order_to_condition:

| Ordno | Condition_ID |
|---|---|
| 0011 | EUR |
| 0012 | USA |
| 0013 | USA |
| 0014 | EUR |
| 0021 | EUR |
| 0022 | USA |
| 0023 | USA |
| 0024 | EUR |

Table lt_inc_attr_id_values—after condition processing (here the unique identifiers for attributes with conditions are constructed by concatenation of attribute ID/value with condition ID):

| ATTR_ID1 | ATTR_Value1 | ATTR_ID2 | ATTR_Value2 | Condition_ID |
|---|---|---|---|---|
| VSBED | 01 | TTYPE | DHL | |
| VSBED | 01 | TTYPE | TNT | |
| VSBED | 01 | TTYPE | UPS | |
| VSBED_USA | 02_USA | TTYPE | FEDEX | USA |
| VSBED_USA | 02_USA | TTYPE | TNT | USA |
| VSBED_USA | 02_USA | TTYPE | UPS | USA |
| VSBED_EUR | 02_EUR | TTYPE | FEDEX | EUR |
| VSBED_EUR | 02_EUR | TTYPE | DHL | EUR |
| VSBED_EUR | 02_EUR | TTYPE | UPS | EUR |

Tables after classification of incompatible entries:
Incompatible vehicle-order attribute:

| Ttype | Attr_ID | Attr_Value |
|---|---|---|
| DHL | VSBED | 01 |
| TNT | VSBED | 01 |
| UPS | VSBED | 01 |
| FEDEX | VSBED_USA | 02_USA |
| TNT | VSBED_USA | 02_USA |
| UPS | VSBED_USA | 02_USA |
| FEDEX | VSBED_EUR | 02_EUR |
| DHL | VSBED_EUR | 02_EUR |
| UPS | VSBED_EUR | 02_EUR |

Order attributes (before filtering of unused attributes):

| Ordno | Attr_ID1 | Attr_Value1 |
|---|---|---|
| 0011 | VSBED | 01 |
| 0011 | VSBED_EUR | 01_EUR |
| 0012 | VSBED | 01 |
| 0012 | VSBED_EUR | 01_EUR |
| 0013 | VSBED | 02 |
| 0013 | VSBED_USA | 02_USA |
| 0014 | VSBED | 02 |
| 0014 | VSBED_USA | 02_USA |
| 0021 | VSBED | 01 |
| 0021 | VSBED_EUR | 01_EUR |
| 0022 | VSBED | 01 |
| 0022 | VSBED_USA | 01_USA |
| 0023 | VSBED | 02 |
| 0023 | VSBED_USA | 02_USA |
| 0024 | VSBED | 02 |
| 0024 | VSBED_EUR | 02_EUR |

-continued

| Ordno | Attr_ID1 | Attr_Value1 |
|---|---|---|
| 0025 | VSBED | 03 |
| 0026 | VSBED | 03 |

Order attributes to be appended to et_ord_attr (after filtering of not-used attributes):

| Ordno | Attr_ID1 | Attr_Value1 |
|---|---|---|
| 0011 | VSBED | 01 |
| 0012 | VSBED | 01 |
| 0013 | VSBED_USA | 02_USA |
| 0014 | VSBED_USA | 02_USA |
| 0021 | VSBED | 01 |
| 0022 | VSBED | 01 |
| 0023 | VSBED_USA | 02_USA |
| 0024 | VSBED_EUR | 02_EUR |

Output Tables

Incompatible vehicle-order attributes:

| Ttype | Attr_ID | Attr_Value |
|---|---|---|
| DHL | VSBED | 01 |
| TNT | VSBED | 01 |
| UPS | VSBED | 01 |
| FEDEX | VSBED_USA | 02_USA |
| TNT | VSBED_USA | 02_USA |
| UPS | VSBED_USA | 02_USA |
| FEDEX | VSBED_EUR | 02_EUR |
| DHL | VSBED_EUR | 02_EUR |
| UPS | VSBED_EUR | 02_EUR |

Incompatible order attribute-order attributes:

| Attr_ID1 | Attr_Value1 | Attr_ID2 | Attr_Value2 |
|---|---|---|---|
| TRAGR | FOOD | TRAGR | ELECTRONICS |

Order Attributes:

| Ordno | Attr_ID1 | Attr_Value 1 |
|---|---|---|
| 0011 | TRAGR | FOOD |
| 0011 | VSBED | 01 |
| 0012 | TRAGR | FOOD |
| 0012 | VSBED | 01 |
| 0013 | TRAGR | FOOD |
| 0013 | VSBED_USA | 02_USA |
| 0014 | TRAGR | FOOD |
| 0014 | VSBED_USA | 02_USA |
| 0021 | TRAGR | ELECTRONICS |
| 0021 | VSBED | 01 |
| 0022 | TRAGR | ELECTRONICS |
| 0022 | VSBED | 01 |
| 0023 | TRAGR | ELECTRONICS |
| 0023 | VSBED_USA | 02_USA |
| 0024 | TRAGR | ELECTRONICS |
| 0024 | VSBED_EUR | 02_EUR |
| 0025 | TRAGR | ELECTRONICS |
| 0026 | TRAGR | ELECTRONICS |

Other tables for incompatibilities are empty.

Example for optimizer processing of incompatibilities

Characteristics-based clustering of orders into groups—Here, we focus on the table that defines the characteristics of the different orders. An example table with the three columns ORDER. CHAR, and VAL is given below:

| ORDER | CHAR | VAL |
|---|---|---|
| 1 | 1 | 1 |
| 1 | 2 | 1 |
| 2 | 1 | 2 |
| 2 | 2 | 1 |
| 3 | 1 | 1 |
| 4 | 1 | 2 |
| 4 | 2 | 1 |
| 6 | 1 | 3 |
| 6 | 2 | 1 |
| 7 | 1 | 2 |
| 7 | 2 | 1 |
| 8 | 1 | 1 |
| 8 | 2 | 2 |
| 9 | 1 | 3 |
| 9 | 2 | 1 |
| 10 | 1 | 1 |
| 10 | 2 | 3 |
| 10 | 3 | 1 |
| 11 | 1 | 1 |
| 11 | 2 | 3 |
| 11 | 3 | 1 |
| 12 | 1 | 1 |
| 12 | 2 | 3 |
| 12 | 3 | 2 |
| 13 | 1 | 1 |
| 14 | 1 | 2 |
| 14 | 2 | 1 |
| 16 | 3 | 2 |
| 17 | 1 | 3 |
| 17 | 2 | 1 |
| 18 | 1 | 4 |
| 18 | 2 | 2 |
| 19 | 1 | 3 |
| 19 | 2 | 1 |
| 20 | 1 | 1 |
| 20 | 2 | 1 |

The clustering algorithm produces a result, which can is shown from two different perspectives:

The first perspective is the list of all clusters. For each group, the characteristics and values are given, as well as the orders that have exactly these characteristics and values.

The second perspective lists for each combination of characteristic and value, for which at least one order exists, the clusters that contain the orders having this combination.

Now, here is the outcome of the algorithm, viewed from both perspectives.

| Group | (CHAR, VAL) combinations | Orders |
|---|---|---|
| 1 | (1, 1) (2, 1) | 1 20 |
| 2 | (1, 2) (2, 1) | 2 4 7 14 |
| 3 | (1, 1) | 3 13 |

-continued

| Group | (CHAR, VAL) combinations | Orders |
|---|---|---|
| 4 | (1, 3) (2, 1) | 6 9 17 19 |
| 5 | (1, 1) (2, 2) | 8 |
| 6 | (1, 1) (2, 3) (3, 1) | 10 11 |
| 7 | (1, 1) (2, 3) (3, 2) | 12 |
| 8 | (3, 2) | 16 |
| 9 | (1, 4) (2, 2) | 18 |
| 10 | None | 5 15 |

| CHAR | VAL | Corresponding groups |
|---|---|---|
| 1 | 1 | 1 3 5 6 7 |
| 1 | 2 | 2 |
| 1 | 3 | 4 |
| 1 | 4 | 9 |
| 2 | 1 | 1 2 4 |
| 2 | 2 | 5 9 |
| 2 | 3 | 6 7 |
| 3 | 1 | 6 |
| 3 | 2 | 7 8 |

There are ten groups. The first nine were explicitly generated by the first loops in the clustering algorithm, whereas the tenth contains those orders which are not contained in the first nine groups. This last group contains orders (in our example 5 and 15), for which no characteristics were declared in the input table.

Figure 13:
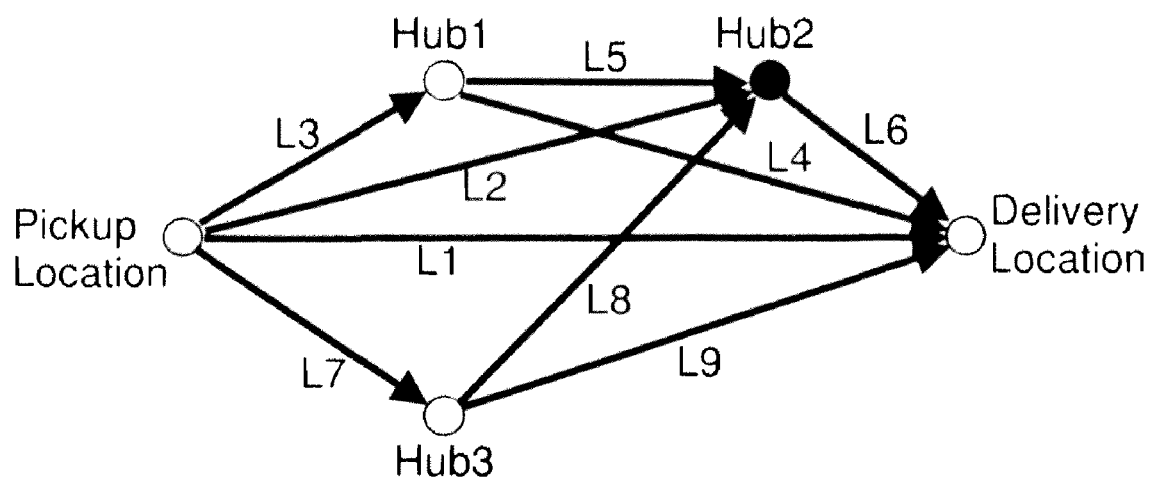
FIGS. 13 to 16 illustrate the feasible path finding in a hub network model in the different phases of processing.

Build Object-Oriented Optimizer Model—Assume the hub network ('Hub1'-'Hub3') with the possible legs ('L1'-'L9') for one selected order (has OrderGroup 'Group1') illustrated in FIG. 13.

Now assume table IncHubGroup with the entries

| Hub | Group |
|---|---|
| Hub3 | Group1 |
| ... | ... |

Figure 14:
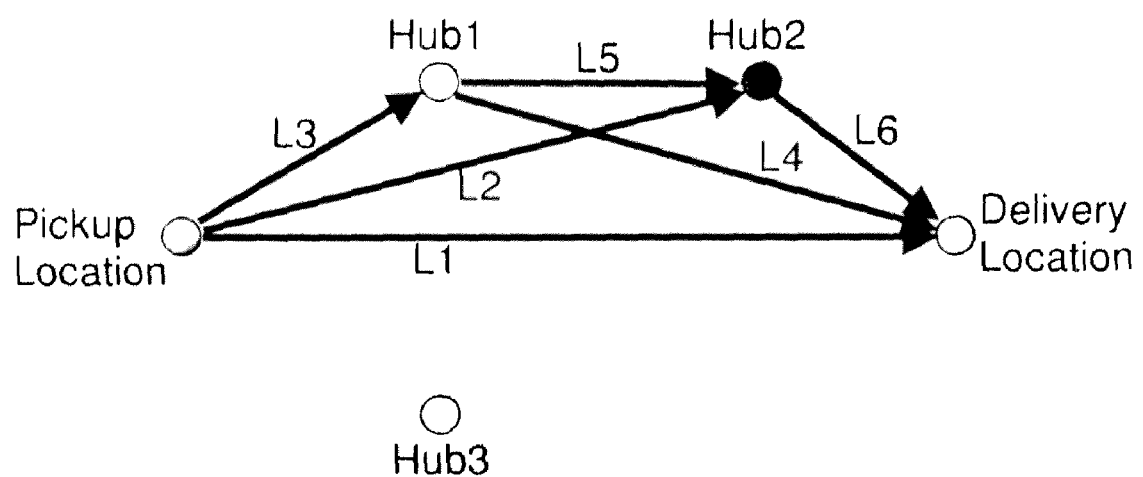

Hub3 must be removed including all legs where Hub3 is involved (these are the legs 'L7'-'L9'). The remaining legs are feasible legs of the order, see FIG. 14.

The general assignment (without considering further incompatibilities) of vehicle to the remaining feasible legs is shown in the following table:

| Leg | Vehicle |
|---|---|
| L1 | V1, V2, V3 |
| L2 | V1, V2, V3, V4 |
| L3 | V1, V2, V3, V4 |
| L4 | V1, V2, V3, V4 |
| L5 | V1, V2, V3, V4, V5 |
| L6 | V1, V2 |

The next step is to process table IncVehHub, which in this example looks like

| Vehicle | Hub |
|---|---|
| V2 | Hub2 |
| ... | ... |

As a result, the legs L2, L5 and L6 (Hub2 is one location of the leg) can't use V2, this vehicle has to be removed from the set of feasible vehicles.

| Leg | Vehicle |
|---|---|
| L1 | V1, V2, V3 |
| L2 | V1, V3, V4 |
| L3 | V1, V2, V3, V4 |
| L4 | V1, V2, V3, V4 |
| L5 | V1, V3, V4, V5 |
| L6 | V1 |

If we additionally assume incompatibilities between vehicle and orders (OrderGroups, table IncVehGroup), we must reduce the feasible vehicles of a leg.

| Vehicle | OrderGroup |
|---|---|
| V1 | Group1 |
| ... | ... |

V1 has to be removed from all legs. The final FeasibleVehiclesOfLeg-objects were filled as written below:

| Leg | Vehicle |
|---|---|
| L1 | V2, V3 |
| L2 | V3, V4 |
| L3 | V2, V3, V4 |
| L4 | V2, V3, V4 |
| L5 | V3, V4, V5 |
| L6 | |

Figure 15:
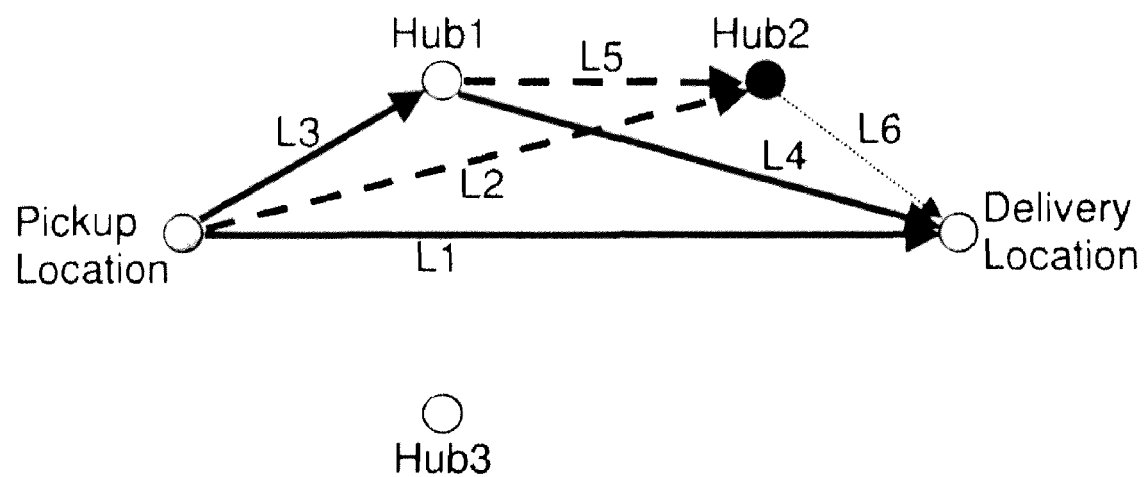

Leg L6 has no feasible vehicle anymore, so it cannot be used, see FIG. 15.

Figure 16:
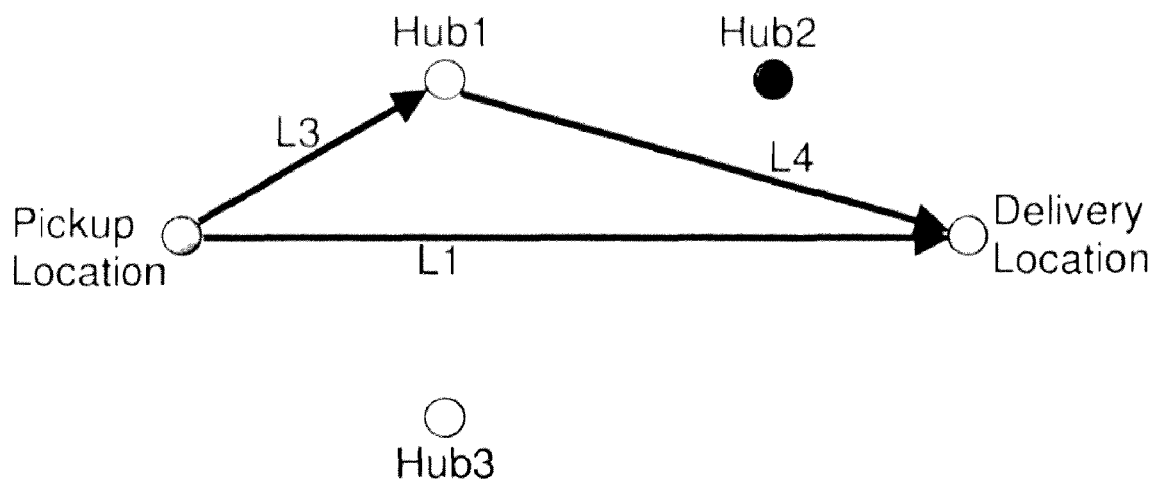

As no path from the pickup location to delivery location including legs L2 and L5 can be built, these two legs are not usable and they are removed from the model. The remaining FeasibleLegsOfOrder objects are the objects for L1. L3 and L4 with its FeasibleVehiclesOfLeg objects, see FIG. 16.

Build Reduced Groups—The following given orders with their OrderGroups are assumed:

| Order | OrderGroup | Remark |
|---|---|---|
| O1 | 1 | |
| O2 | 2 | |
| O3 | 3 | |
| O4 | 4 | |
| O5 | 5 | |
| O6 | 6 | Not selected |
| O7 | 6 | |
| O8 | 7 | |
| O9 | 8 | |
| O10 | 9 | Not selected |
| O11 | 10 | |
| O12 | 11 | |
| O13 | 12 | |
| O14 | 13 | Not performable |
| O15 | 14 | |
| O16 | 15 | |
| O17 | 16 | |
| O18 | 17 | |
| O19 | 18 | |
| O20 | 18 | |

The incompatibility matrix resulting from clustering incompatibilities into OrderGroups looks as follows:

| OGrp | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| 1 | C | C | C | C | C | I | C | C | C | C | C | C | C | C | C | I | C | C |
| 2 | C | C | C | C | C | C | C | C | I | C | C | C | C | C | C | C | C | C |
| 3 | C | C | C | C | C | C | C | C | C | C | C | C | C | I | C | C | C | C |
| 4 | C | C | C | C | C | C | C | C | C | C | C | C | C | C | C | C | I | C |
| 5 | C | C | C | C | C | I | C | C | C | C | C | C | I | C | C | I | C | C |
| 6 | I | C | C | C | I | C | I | C | C | C | C | C | C | C | C | C | C | C |
| 7 | C | C | C | C | C | I | C | C | C | C | C | C | C | C | I | I | C | C |
| 8 | C | C | C | C | C | C | C | C | C | C | C | C | C | C | C | C | C | C |
| 9 | C | I | C | C | C | C | C | C | C | C | C | C | C | C | C | C | C | C |
| 10 | C | C | C | C | C | C | C | C | C | C | C | C | C | C | C | C | I | C |
| 11 | C | C | C | C | C | C | C | C | C | C | C | C | C | I | C | C | C | C |
| 12 | C | C | C | C | C | C | C | C | C | C | C | C | I | C | C | C | C | C |
| 13 | C | C | C | C | I | C | C | C | C | C | C | C | C | C | C | C | C | I |
| 14 | C | C | I | C | C | C | C | C | C | C | I | I | C | C | C | C | C | C |
| 15 | C | C | C | C | C | C | I | C | C | C | C | C | C | C | C | C | C | C |
| 16 | I | C | C | C | I | C | I | C | C | C | C | C | C | C | C | C | C | C |
| 17 | C | C | C | I | C | C | C | C | C | I | C | C | C | C | C | C | C | C |
| 18 | C | C | C | C | C | C | C | C | C | C | C | C | I | C | C | C | C | C |

The OrderGroups 9 and 13 can be eliminated since the orders using those OrderGroups (orders O9 and O14) are not selected or not performable, but OrderGroup 6 must remain, since only one of the two orders using this OrderGroup is not selected (order O6), while the other order O7 still can be performed in the current sub-problem.

After removing the corresponding rows and columns from the incompatibility matrix, it looks as follows:

| OGrp | 1 | 2 | 3 | 4 | 5 | 6 | 7 | 8 | 10 | 11 | 12 | 14 | 15 | 16 | 17 | 18 |
|---|---|---|---|---|---|---|---|---|---|---|---|---|---|---|---|---|
| 1 | C | C | C | C | C | I | C | C | C | C | C | C | C | I | C | C |
| 2 | C | C | C | C | C | C | C | C | C | C | C | C | C | C | C | C |
| 3 | C | C | C | C | C | C | C | C | C | C | C | I | C | C | C | C |
| 4 | C | C | C | C | C | C | C | C | C | C | C | C | C | C | I | C |
| 5 | C | C | C | C | C | I | C | C | C | C | C | C | C | I | C | C |
| 6 | I | C | C | C | I | C | I | C | C | C | C | C | C | C | C | C |
| 7 | C | C | C | C | C | I | C | C | C | C | C | C | I | I | C | C |
| 8 | C | C | C | C | C | C | C | C | C | C | C | C | C | C | C | C |
| 10 | C | C | C | C | C | C | C | C | C | C | C | C | C | C | I | C |
| 11 | C | C | C | C | C | C | C | C | C | C | C | I | C | C | C | C |
| 12 | C | C | C | C | C | C | C | C | C | C | C | I | C | C | C | C |
| 14 | C | C | I | C | C | C | C | C | C | I | I | C | C | C | C | C |
| 15 | C | C | C | C | C | C | I | C | C | C | C | C | C | C | C | C |
| 16 | I | C | C | C | I | C | I | C | C | C | C | C | C | C | C | C |
| 17 | C | C | C | I | C | C | C | C | I | C | C | C | C | C | C | C |
| 18 | C | C | C | C | C | C | C | C | C | C | C | C | C | C | C | C |

Now one can find the equivalence classes, which are:

| Equivalence class (RGroup) | Members (OrderGroups) |
|---|---|
| 1 | 1, 5 |
| 2 | 2, 8, 18 |
| 3 | 3, 11, 12 |
| 4 | 4, 10 |
| 5 | 6, 16 |
| 6 | 7 |
| 7 | 14 |
| 8 | 15 |
| 9 | 17 |
| 'Unused' | 9, 13 |

Shrinking the incompatibility matrix to one reference member per equivalence class (delete the rows and columns of all but one member of the equivalence classes) yields the incompatibility matrix

| RGroup | 1 | 2 | 3 | 4 | 6 | 7 | 14 | 15 | 17 |
|---|---|---|---|---|---|---|---|---|---|
| 1 | C | C | C | C | I | C | C | C | C |
| 2 | C | C | C | C | C | C | C | C | C |
| 3 | C | C | C | C | C | C | I | C | C |
| 4 | C | C | C | C | C | C | C | C | I |
| 6 | I | C | C | C | C | I | C | C | C |
| 7 | C | C | C | C | I | C | C | I | C |
| 14 | C | C | I | C | C | C | C | C | C |
| 15 | C | C | C | C | C | I | C | C | C |
| 17 | C | C | C | I | C | C | C | C | C |

This matrix is (with replacing the reference OrderGroup per equivalence class with the RGroup assigned to the equivalence class) the final reduced incompatibility matrix:

| RGroup | 1 | 2 | 3 | 4 | 5 | 6 | 7 | 8 | 9 |
|---|---|---|---|---|---|---|---|---|---|
| 1 | C | C | C | C | I | C | C | C | C |
| 2 | C | C | C | C | C | C | C | C | C |
| 3 | C | C | C | C | C | C | I | C | C |
| 4 | C | C | C | C | C | C | C | C | I |
| 5 | I | C | C | C | C | I | C | C | C |
| 6 | C | C | C | C | I | C | C | I | C |
| 7 | C | C | I | C | C | C | C | C | C |
| 8 | C | C | C | C | C | I | C | C | C |
| 9 | C | C | C | I | C | C | C | C | C |

To complete the output, this is the mapping of OrderGroups to RGroups:

| OrderGroup | RGroup |
|---|---|
| 1 | 1 |
| 2 | 2 |
| 3 | 3 |
| 4 | 4 |
| 5 | 1 |
| 6 | 5 |
| 7 | 6 |
| 8 | 2 |
| 9 | 'Unused' |
| 10 | 4 |
| 11 | 3 |
| 12 | 3 |
| 13 | 'Unused' |
| 14 | 7 |
| 15 | 8 |
| 16 | 5 |
| 17 | 9 |
| 18 | 2 |

It is assumed that transportation optimizer is capable to respect four "atomic" incompatibility constraints, which are retrieved by compatibility engine:

Group-Group: Order group A is incompatible with order group B, i.e. it is not allowed to transport orders from group A on the same vehicle as orders from group B.

Group-Hub: Order group A must not be shipped indirectly through hub B.

Group-Vehicle: Order group A must not be shipped by vehicle B.

Vehicle-Hub: Vehicle A must not load/unload orders at hub B.

(Cross-docking location corresponds to hub, group is order characteristic in optimizer model).

Therefore the incompatibilities, which were determined by compatibility engine, can be directly mapped to corresponding optimizer tables.

Manual planning is direct assignment of specific freight units to vehicle of particular vehicle.

To detect and inform planner about possible incompatibilities the relevant objects can be collected and passed to compatibility engine. The engine provides as output incompatibilities which were encountered between particular objects. Therefore they can be displayed to alert user.

FIG. 17 is a screen shot of a Compatibility Type definition transaction screen.

Figure 18:
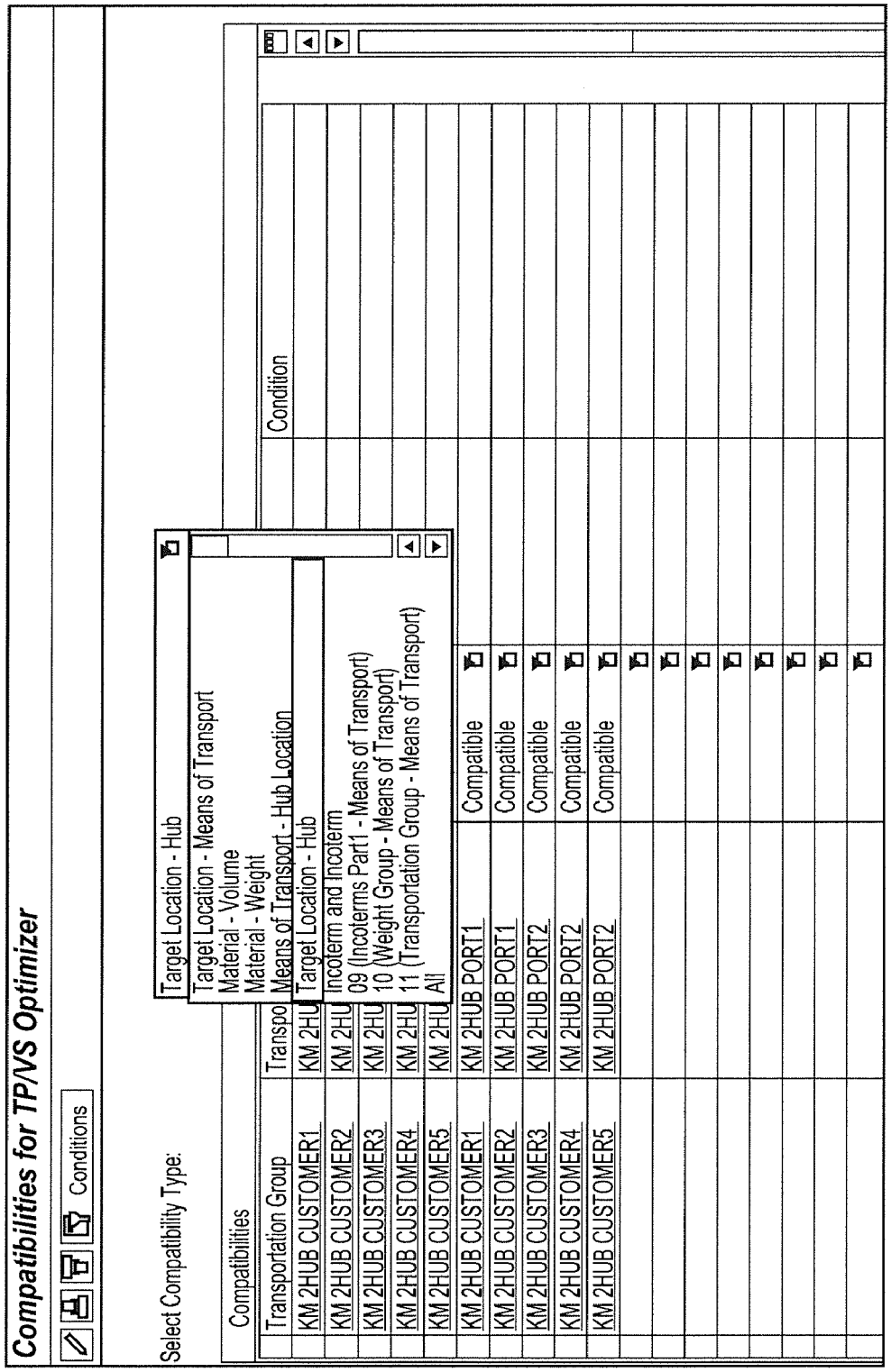

FIGS. 18 and 19 are screen shots of Compatibility definition transaction screens.

The present techniques can be implemented in digital electronic circuitry, or in computer hardware, firmware, software, or in combinations of them. Apparatus of the invention can be implemented in a computer program product tangibly embodied in a machine-readable storage device for execution by a programmable processor. Method steps according to the invention can be performed by a programmable processor executing a program of instructions to perform functions of the invention by operating on the basis of input data, and by generating output data. The invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories, in particular from read-only memories and/or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

The computer systems or distributed computer networks as mentioned above may be used, for example, for producing goods, delivering parts for assembling products, controlling technical or economical processes, or implementing telecommunication activities.

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus. The hard drive controller is coupled to a hard disk drive suitable for storing executable computer programs, including programs embodying the present technique. The I/O controller is coupled by means of an I/O bus to an I/O interface. The I/O interface receives and transmits in analogue or digital form over at least one communication link. Such a communication link may be a serial link, a parallel link, local area network, or wireless link (e.g. an RF communication link). A display is coupled to an interface, which is coupled to an I/O bus. A keyboard and pointing device are also coupled to the I/O bus. Alternatively, separate buses may be used for the keyboard pointing device and I/O interface.

Other embodiments are in the scope of the following claims.

The invention claimed is:

1. A method of modeling incompatibilities in a transportation planning and optimization system, comprising:
- providing, by a computer, a data structure for a field catalogue, the field catalogue providing data field attributes, each of the attributes representing one of freight units, vehicles, and cross-docking locations, respectively;
- providing, by the computer, a data structure for a plurality of compatibility types, the data structure providing for each compatibility type data fields for:
  - a first entry for linking the compatibility type structure with a first attribute of the field catalogue;
  - a second entry for linking the compatibility type structure with a second attribute of the field catalogue;
- providing a number of different compatibility types, each compatibility type being described by values of the data fields as defined in the provided compatibility type data structure;
- providing a number of compatibility rules, each compatibility rule specifying a combination of two values which refer to first and second attributes of a defined compatibility type, and being indicative whether or not they are compatible,
- applying, by the computer, the compatibility rules to determine compatible combinations of freight units, vehicles, and cross-docking locations for the shipments of the transportation plan;
- determining, by the computer, a transportation plan for a plurality of orders, each order defined by a set of characteristics, at least one characteristic including a number of freight units to be transported from a predetermined place of departure to a predetermined place of destination, each freight unit representing a predefined good, the transportation plan including a plurality of vehicles for transporting freight units, and a plurality of cross-docking locations for loading/unloading freight units onto/from vehicles, each of the freight units, vehicles, and cross docking locations being specified by attributes retained in the field catalogue;
- defining shipments within the transportation plan, each shipment specifying the vehicles, and cross-docking locations needed to fulfill a plurality of orders, wherein incompatible number of freight units, vehicles, and cross-docking locations are not allowed within the same shipment.

2. The method of claim 1, wherein the compatibility type data structure further provides a data field for an ID for identifying the respective compatibility type.

3. The method of claim 2, wherein the ID is a numeric value.

4. The method of claim 1, wherein the compatibility types comprise at least one of:
- transportation group, and transportation group;
- vehicle, and transportation group;
- incoterm, and incoterm;
- cross-docking location, and transportation group;
- delivery priority, and cross-docking location;
- delivery priority, and vehicle;
- shipping conditions, and cross-docking location;
- shipping conditions, and vehicle;
- weight/volume group, and vehicle;
- weight/volume group, and cross-docking location;
- transportation zone, and vehicle; and
- cross-docking location, and vehicle.

5. The method of claim 1, wherein a compatibility rule further comprises a condition ID for restricting the applicability of the compatibility rule onto predefined orders.

6. A machine readable storage medium having instructions stored thereon that when executed by the machine cause the machine to:
- obtain data descriptive of an order having a set of characteristic including at least freight units to be transported;
- identify available vehicles and available cross-docking locations;
- apply a set of compatibility rules to the possible combinations of orders, vehicles and cross-docking locations;
- associate a compatibility value with each order consistent with the compatibility rules so that orders having a same set of characteristics are assigned a same compatibility value;
- group the orders having the same compatibility value;
- define as a class any groups having a same compatibility relationship to all other groups;
- create a data representation of the classes;
- generate an incompatibility matrix representing the incompatibilities between pairs of groups;
- generate a data structure representing incompatibilities between vehicles and orders and orders and cross-docking locations; and
- generate a data structure representing incompatibilities between crossdocking locations and vehicles.

7. The method of claim 1, wherein the data structure for a plurality of compatibility types represents models of a plurality of different order attributes in a single transaction.

* * * * *